US011915283B1

(12) United States Patent
Hann et al.

(10) Patent No.: US 11,915,283 B1
(45) Date of Patent: Feb. 27, 2024

(54) COST SHARING PLATFORM AND SYSTEM

(71) Applicant: HannDev, LLC, Davenport, IA (US)

(72) Inventors: Mark A. Hann, LeClaire, IA (US); Kristopher Oswald, Davenport, IA (US); Eian Aldrich, Davenport, IA (US)

(73) Assignee: SplitCart LLC, Bettendorf, IA (US)

( * ) Notice: Subject to any disclaimer, the term of this patent is extended or adjusted under 35 U.S.C. 154(b) by 0 days.

(21) Appl. No.: 16/993,187

(22) Filed: Aug. 13, 2020

Related U.S. Application Data

(60) Provisional application No. 63/044,230, filed on Jun. 25, 2020, provisional application No. 62/886,150, filed on Aug. 13, 2019.

(51) Int. Cl.
*G06Q 30/0601* (2023.01)
*G06Q 20/12* (2012.01)
(Continued)

(52) U.S. Cl.
CPC ..... *G06Q 30/0605* (2013.01); *G06Q 20/0855* (2013.01); *G06Q 20/12* (2013.01);
(Continued)

(58) Field of Classification Search
CPC ............... G06Q 30/02; G06Q 30/0206; G06Q 30/0279; G06Q 30/0283; G06Q 30/04;
(Continued)

(56) References Cited

U.S. PATENT DOCUMENTS 5,663,547 A 9/1997 Ziarno
5,960,411 A 9/1999 Hartman et al.
(Continued)

FOREIGN PATENT DOCUMENTS

WO 2001029787 A2 4/2001
WO 02095635 A1 11/2002
(Continued)

OTHER PUBLICATIONS

Investopedia stock analysis: How splitwise works and makes money (Oct. 21, 2018). . Chatham: Newstex. Retrieved from https://dialog.proquest.com/professional/docview/2123820565?accountid=131444 (Year: 2018).*
(Continued)

*Primary Examiner* — William J Allen
(74) *Attorney, Agent, or Firm* — Hamilton IP Law, PC.; Jay R. Hamilton

(57) ABSTRACT

A Cost Sharing Method and Platform that uses scrapping API technology to collect and project key categories of items available for sale on multiple sites on the internet is disclosed herein. As disclosed, the Cost Sharing Method and Platform (hereinafter "System" aka Splitcart) allows the user to pay for that item or share the cost of the item with other people. Payments are recorded through the system and with payments processed upon finalization of the Splitcart as defined by the organizer. As configured, the organizer is able to choose how many splitters (contributors) there will be and decide if he/she wants to cover the cost difference if funds are not met and/or convert total funds collected to a gift card. The SplitCart may have social media contacts and or connections enabled to allow for a user to use their social media platform to recruit "splitters" and recipients to a cost sharing opportunity.

18 Claims, 19 Drawing Sheets

(51) Int. Cl.
*G06Q 30/04* (2012.01)
*G06Q 20/08* (2012.01)
*G06Q 30/0208* (2023.01)
*G06Q 30/0214* (2023.01)
*H04L 51/046* (2022.01)

(52) U.S. Cl.
CPC ..... *G06Q 30/0208* (2013.01); *G06Q 30/0214* (2013.01); *G06Q 30/04* (2013.01); *G06Q 30/0617* (2013.01); *G06Q 30/0641* (2013.01); *H04L 51/046* (2013.01)

(58) Field of Classification Search
CPC ..... G06Q 30/0601–0643; G06Q 20/12; G06Q 30/0605; G06Q 20/0855; G06Q 30/0208; G06Q 30/0214; G06Q 30/0617; G06Q 30/0641; G06Q 30/0207–0239; G06Q 20/123; G06Q 30/06–0645; G06Q 50/01
See application file for complete search history.

(56) References Cited

U.S. PATENT DOCUMENTS

| | | |
|---|---|---|
| 7,013,292 B1 | 3/2006 | Hsu et al. |
| 7,444,297 B2 | 10/2008 | Shah |
| 7,792,699 B2 | 9/2010 | Kwei |
| 7,933,810 B2 | 4/2011 | Morgenstern |
| 8,170,922 B2 | 5/2012 | Cavagnaro |
| 9,760,936 B1 | 9/2017 | Shaw et al. |
| 10,121,127 B1 | 11/2018 | Isaacson et al. |
| 10,679,207 B1 | 6/2020 | Huffines et al. |
| 2002/0042775 A1 | 4/2002 | Nelson et al. |
| 2002/0138573 A1 | 9/2002 | Saguy |
| 2004/0143600 A1* | 7/2004 | Musgrove ......... G06F 16/24575 |
| 2004/0148228 A1* | 7/2004 | Kwei .................... G06Q 30/06 705/26.4 |
| 2006/0161484 A1 | 7/2006 | Pandhe |
| 2007/0208627 A1 | 9/2007 | Abadi |
| 2008/0243684 A1 | 10/2008 | Ng et al. |
| 2008/0301005 A1 | 12/2008 | Nieda et al. |
| 2009/0254447 A1 | 10/2009 | Blades |
| 2010/0010906 A1 | 1/2010 | Grecia |
| 2010/0197754 A1 | 8/2010 | Chen et al. |
| 2010/0306040 A1* | 12/2010 | Arumugam ........... G06Q 30/02 705/14.16 |
| 2012/0150729 A1 | 6/2012 | Isaacson et al. |
| 2012/0226587 A1 | 9/2012 | Lara |
| 2012/0226614 A1* | 9/2012 | Gura ................ G06Q 30/0605 705/44 |
| 2013/0046590 A1 | 2/2013 | Abraham et al. |
| 2013/0185195 A1 | 7/2013 | Hull et al. |
| 2013/0226688 A1 | 8/2013 | Harvilicz et al. |
| 2014/0074691 A1 | 3/2014 | Bank et al. |
| 2017/0287086 A1* | 10/2017 | Lopez .................... G06Q 50/12 |
| 2018/0165675 A1* | 6/2018 | Isaacson ............. G06Q 20/105 |

FOREIGN PATENT DOCUMENTS

| | | |
|---|---|---|
| WO | 2002095635 A1 | 11/2002 |
| WO | 2013036856 A2 | 3/2013 |

OTHER PUBLICATIONS

Paycent, the Split Bill Phenomenon, https://paycent.comisplit-bill-phenomenon/.

* cited by examiner

COST SHARING PLATFORM AND SYSTEM

CROSS REFERENCE TO RELATED APPLICATIONS

Applicant states that this utility, non-provisional patent application claims priority from provisional U.S. Pat. App. No. 62/886,150 filed on Aug. 13, 2019 and provisional U.S. Pat. App. No. 63/044,230 filed on Jun. 25, 2020. All of the preceding applications are incorporated by reference herein in their entireties.

FIELD OF THE INVENTION

The present disclosure is related to methods for sharing the cost of an item, and more particularly for an item procured electronically.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. § 1.171 (c)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

INVENTION SUMMARY

The Cost Sharing Platform and System disclosed herein (alternatively referred interchangeably to as "Splitcart" which is Applicant's exclusive trademark) is a method and system for making your life (the organizer) easier by automating the age-old process of finding, acquiring and contributing to a purchase. Splitcart is method and system to split the cost of an item found through various sites offering products for sale on the Internet. These items would be for someone you know and the cost would be shared with others you know. It is a safe, efficient and effective way to make sure all the funds are collected and used towards a specific item. The system and method disclosed allows all parties to receive acknowledgement for their participation and make the receiver feel as though he/she received an item that is needed and well thought-out. Splitcart eliminates unwanted, cheap and useless purchases due to budgetary constraints. In at least one embodiment disclosed herein, Splitcart automate and facilitates the process of collecting funds for mutual purchases. In another embodiment as disclosed herein, Splitcart automates and facilitates the process of collecting funds for mutual purchases that may be in excess of any one contributor's individual budget. Applicable events and celebrations for the methods and system disclosed herein could include without limitation or restriction weddings, baby showers, bosses' birthdays, retirement parties, helping parents buy things, helping out someone in need and helping students or children purchase needed items. Splitcart can also help separated parents share the cost of needed items without involving the child as a means to transfer money but also guarantee the money goes to the exact items of need. Splitcart could also be used for prank gifts amongst friends as well. The Cost Sharing Platform and System disclosed herein is useful for any situation wherein the cost of an items desired is in excess of what one person may be willing to contribute, Splitcart is an electronic system that allows a plurality of contributors to chip in on the desired item to be purchased, which may also include taxes, wrapping and shipping costs. The Cost Sharing Platform and System allows calculation of all costs and equitable distribution across the various users.

DETAILED DESCRIPTION—BRIEF DESCRIPTION OF DRAWINGS

The accompanying drawings, which are incorporated in and constitute a part of this specification, illustrate embodiments and together with the description, serve to explain the principles of the methods and systems.

Figure 1:
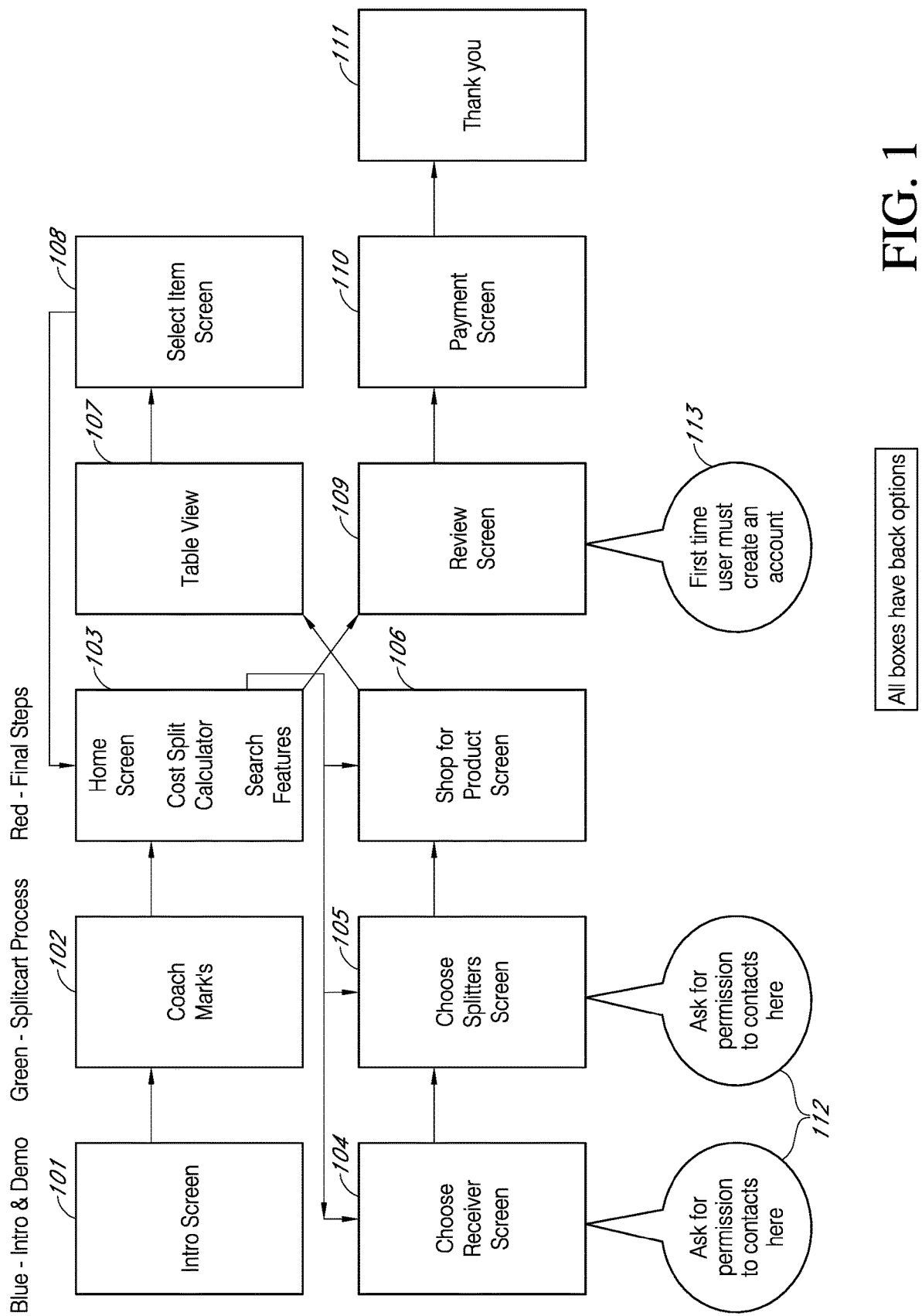
FIG. 1 is an overview of a gift splitting process for use of an application or a website as disclosed herein.

Appendix A, incorporated by reference herein, provides additional screenshots of the Cost Sharing Platform and System as enabled via a smartphone or tablet application.

DETAILED DESCRIPTION - LISTING OF ELEMENTS

| Element Description | Element Number |
|---|---|
| Cost Sharing Platform and System (aka SplitCart) | 100 |
| Order produced via SplitCart | 100a |
| Intro Screen | 101 |
| Coach mark's | 102 |
| Home screen | 103 |
| Choose receiver option | 104 |
| Receiver | 104a |
| Choose Splitter option | 105 |
| Splitter (contributor) | 105a |
| Shop for product | 106 |
| Table view of products | 107 |
| Select Item screen | 108 |
| Review Screen | 109 |
| Payment Screen | 110 |
| Thank You Screen | 111 |
| Ask for permission for contacts | 112 |
| User contacts | 112a |
| User | 113 |
| First time user create an account | 113a |
| Manual search bar (not shown) | 114 |
| SplitCart cost calculator | 115 |
| User contacts | 116 |
| Selected Product | 117 |
| Menu action icon (Hamburger menu) | 118 |
| Search button (feature) | 119 |
| Unique Splitcart ID creation | 200 |
| Organizer process | 201 |
| Notification (to the three Splitter/Contributors) | 202 |
| Receiving information | 203 |
| Accepted offer | 204 |
| Rejected offer | 205 |
| Ignored offer | 206 |
| Confirmed text/email | 207 |
| Detailed message | 208 |
| Decision (accept/deny/reject) | 209 |
| "Denied" pathway | 210 |
| "END" | 211 |
| Organizer | 212 |
| "Ignore" pathway | 213 |
| Reminder (to the Splitter/Contributor) | 214 |
| Original request sent (Splitcart initiated) (Mark) | 301 |
| Accepted offer (Kris) | 302 |
| Accepted offer (Eian) | 303 |
| Accepted offer (Sid) | 304 |
| Fund confirmation | 305 |
| Funds pulled via Application Program Interface (Fund API) | 306 |
| Other | 307 |
| Order pushes to cloud | 308 |
| Order executed | 309 |
| Retailer ships product | 310 |
| Retailer website | 310a |
| Delivered to client | 311 |
| All CC's stored with gateway | 312 |
| Invitation to Splitters | 313 |
| 24-hour process (before deadline) | 401 |
| 24-hour window | 401 |
| Partial funds collected | 402 |
| Cover the difference option offered | 403 |
| First trigger | 404 |

DETAILED DESCRIPTION - LISTING OF ELEMENTS

| Element Description | Element Number |
|---|---|
| ("Have all funds been collected?") "Yes" | 405 |
| Ordered Item | 406 |
| Confirmed text/email | 407 |
| "No" | 408 |
| Reminder notification (text/email) | 409 |
| Deadline (for collecting fund) | 410 |
| Second trigger | 411 |
| ("Have all funds been collected?") "Yes" (for second trigger) | 412 |
| "No" (for second trigger) | 413 |
| Conversion to gift card option | 414 |
| "Yes" (for gift card) | 415 |
| Order of gift card | 416 |
| "No" (for gift card) | 417 |
| Third trigger ("Cover the remaining balance due?") | 418 |
| "Yes" (for third trigger) | 419 |
| "No" (for third trigger) | 420 |
| Cancellation | 421 |
| Logged in Splitcart's application | 500 |
| Motion Graphics 1 | 501 |
| Motion Graphics 2 | 502 |
| SplitCart App (user interface) | 510 |
| Coach marks | 601 |
| Manual Search | 701 |
| Categories search | 702 |
| Home view controller | 703 |
| Carousel of items | 704 |
| Splitcart Cost Calculator | 705 (aka 115) |
| Outer ring | 706 |
| Inner ring | 707 |
| Rest | 708 |
| Contributor cost | 709 |
| Contributor percentage | 710 |
| 4 buttons | 711 |
| Receiver button | 712 |
| Splitters button | 713 |
| Product button | 714 |
| Review button | 715 |
| Manual add of receiver | 801 |
| User card | 802 |
| Splitcart identifier | 803 |
| Manual add of Splitters | 901 |
| User card | 902 |
| Splitter counter | 903 |
| User confirmed | 904 |
| Splitcart identifier | 905 |
| Manual search bar | 1001 |
| Category selection | 1002 |
| 4 buttons | 1003 |
| Manual search bar | 1101 |
| Autofill Apple Framework | 1102 |
| Search button | 1103 |
| Manual search bar | 1201 |
| Filter | 1202 |
| Favorites "Star" | 1203 |
| Back | 1204 |
| Loading indicator | 1205 |
| Item images | 1301 |
| More images | 1302 |
| Item title | 1303 |
| Item price | 1304 |
| Image description | 1305 |
| Similar products | 1306 |
| Select item | 1307 |
| Per Splitter cost | 1401 |
| Organizers percentage | 1402 |
| 4 buttons "complete" | 1403 |

DETAILED DESCRIPTION - LISTING OF ELEMENTS

| Element Description | Element Number |
| --- | --- |
| Select receiver | 1501 |
| Choose Participants | 1502 |
| Go Shopping | 1503 |
| Splitcart Cost Calculator representation | 1504 |
| Numbers breakdown | 1505 |
| Finalize button | 1506 |
| Product main image | 1601 |
| Product description | 1602 |
| Date to collect funds | 1603 |
| Delivery date | 1604 |
| Shipping address | 1605 |
| Payment | 1701 |
| CC info | 1702 |
| Cost breakdown | 1703 |
| Place order | 1704 |
| Terms & Conditions | 1705 |
| User data | 1801 |
| Active Splitcarts | 1802 |
| Notifications | 1803 |
| Favorite Products | 1804 |
| Splitcart history | 1805 |
| Change password | 1806 |
| Update Payments | 1807 |
| Settings | 1808 |
| Address | 1809 |
| Logout | 1810 |
| Creation of Splitcart | 1901 |
| Splitter receives | 1902 |
| Account created | 1903 |
| CC info Stored | 1904 |
| Issue with CC | 1905 |
| Splitcart agreed to execute by all | 1906 |
| CC money pulled | 1907 |
| Order placed | 1908 |
| Issue with CC | 1909 |
| Message to all | 1910 |
| Issue rectified | 1911 |
| Issue not rectified | 1912 |

DETAILED DESCRIPTION OF INVENTION

Before the present methods and apparatuses are disclosed and described, it is to be understood that the methods and apparatuses are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes, from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the figures and their previous and following description.

Before the various embodiments of the present invention are explained in detail, it is to be understood that the invention is not limited in its application to the details of construction and the arrangements of components set forth in the following description. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

The following detailed description is of the best currently contemplated modes of carrying out illustrative embodiments of the invention. The description is not to be taken in a limiting sense but is made merely for the purpose of illustrating the general principles of the invention, since the scope of the invention is best defined by the appending claims. Various inventive features are described below herein that can each be used independently of one another or in combination with other features.

ILLUSTRATIVE EMBODIMENT AND ADVANTAGES OF INVENTION

FIG. 1 illustrates an overview of the System as disclosed herein implemented via an application or a website. Although not shown in detail, one of ordinary skill will appreciate the Splitcart uses a backend computer system for collecting user data, storing user data and executing user data. Each user is assigned a unique Splitcart ID that is used for the purposes of everything related to Splitcarts, that are organized, invited to or participated in. (See FIG. 2 and discussion therein) All systems for money tracking, executing orders, processing return requests, connecting together all Splitcart data, monitoring Splitcarts in progress, email distribution, follow-up processes and every other aspect that requires communication between Splitcart ID's are done through the back-end computer system which is configured to allow multiple people to contribute to the same item purchased via the Splitcart 100. Further, it should be understood that internal notifications support the Splitcart system 100 as disclosed herein. Internal notifications are used for communicating status steps of each Splitcart 100 and are an integral part of the process. Internal notifications can be turned on or off through the settings menu. Internal notifications also act as triggers for specific events and actions to ensure a Splitcart is on task for completion, as further disclosed and discussed herein.

FIG. 1 is an overview of a gift splitting process for use of an application or a website as disclosed herein. As shown in FIG. 1, upon downloading and opening the Splitcart 100 implemented as an application on a computer or smart phone for the first time the user 113 will experience an intro screen 101 then a series of coach mark's 102 highlighting unique areas of the Splitcart 100 implemented via the app including an option to "x" out of the coach mark's 102 will be accessible on every coach mark's 102. Upon the completion of the coach mark's 102 the user 113 will be shown the home screen 103. The home screen 103 will have the manual search bar 114 on the top of the screen, the top portion of categories shown as well as the cost calculator 115 shown. The cost calculator 115 will be the primary focus of the screen and will show a rotation of top selling items with different scenarios laid out. The user 113 will be able to select one of the rotational items for purchase and, upon selection (selected product 117), will direct them to the select item screen 108. The user 113 will also be able to take manual control of the Splitcart cost calculator 115 and enter their own scenario. Upon this action the carousel display of top selling items will continue to rotate but the new item will not impact the cost calculator 115 of the Splitcart. Once the consumer selects a product from the select item screen the carousel will no longer be active, and the consumers product will be represented in the section. The user is allowed to explore the home screen 103, shopping categories screen 106 as well as the manual search bar 114. The user may also access the menu action icon 118 (sometimes referred to as the hamburger menu) to open the app and access the applicable features relative to a new account. (See also written description for FIG. 6 herein and accompanying illustrations) The user may also shop for items and place them onto the home screen 103 to review and modify a Splitcart 100 generated via the app. The user 113 will use either the search bar 114 or the categories section to find an item. When these areas are used the API 306 will scrape the retailer's websites 310a and display the products in a table view 107. When a user 113 chooses a specific item it will be placed in the select item screen 108 which will house the product title, description, price, variants and similar products. All of these things can be done without any demand of information from the app. Upon pressing the receiver or splitters buttons on the bottom of the home screen the app will ask for permission to access the user's contacts 116. As defined herein, a receiver 104a is someone that may receive the product or item selected for purchase by the user 113 using the SplitCart 100. As defined herein, a contributor (splitter) 105a is someone that may contribute to the purchase of the product or item selected for purchase by the user 113. If the user 113 does not allow permissions into the user's contacts 116 the manual entry form will still be available to be utilized. Upon entering the review screen 109 (for the first time and until an account is created) 113 a pop-up demanding login information will appear. Behind the pop up is a slide up view controller with the registration form. User 113 acknowledges the pop-up and can cancel or sign-up or slide down the view controller. The user 113 cannot move forward without logging in or creating an account. A username and password is required for logging in but they can use the FB or Apple framework instead. Although not shown, one of ordinary skill will appreciate that the Splitcart contact system may be adapted to incorporate or work with the users' social media contacts 116a through such social media platforms as Linked-In, Facebook and Instagram without limitation or restriction. For example, the present Splitcart 100 could incorporate the user's connections from social media allowing the contact menu to be further expanded so that the user has the ability to reach into their social networks using popular social media platforms. The organizer would interact with and through social media platforms improve access to users and their contact data. The organizer could also create a Splitcart for public participation which could interface with the users' in the social media platform on separately.

Once a user 113 has created an account and logged in, selected a product 117 and added a receiver 104a of said selected product and splitters 105a (if applicable) of said Splitcart 100, the payment screen 110 will show final pertinent information related to the Splitcart 100. The first time the user 113 creates a Splitcart 100 the review screens shipping area will be blank. The user 113 will fill this in and be prompted to add this to their account profile. An API 306 will validate this address before allowing the user 113 to execute an order 100a generated using Splitcart 100. If the user 113 denies the addition of the address to their profile, the next time they use the app they will receive a new coach mark 102 suggesting the addition of an address to make their experience better. When a user 113 creates an order 100a using Splitcart 100 the application will demand that a receiver 104a, splitter(s) 105a and a product 106a be selected as on the Shop for Product screen 106 in FIG. 1. The first time a user 113 accesses the choose receiver screen 104 or the choose splitters screen 105 the application will ask for permission to access the users contacts 112. Upon the successful selection of these 3 categories the user 113 will ensure the correct shipping address and payment method is loaded into the review screen 109. Once the user 113 presses "finalize" or "order now" or any other embodiment of the action to move forward the application will load the Apple framework for SMS with a predefined message and the splitters phone numbers that were selected during the "splitters" process or on the "splitters" screen 105. One of ordinary skill will appreciate that other operating system frameworks may be substituted for the Apple system to allow for messaging capability without departure from the spirit and intent of the present disclosure. This framework will be modifiable to add a personal note and will also consist of a weblink for the Splitcart order 100a in question. The backend system will also send an email invite to all of those who's emails (in the user contacts 112a) were included and will send an in-app notification for all of those who have already made an account, have the app and have notifications turned on. This link will direct the party receiving the invite (the splitter 105a) to the SplitCart 100 through the app (if downloaded), to the app store or to a web application that acts as the app for people who do not have the app installed nor wish to install the app. Upon a successful invite send the application will show the user 113 a thank you screen 111 where they have the option to return to the home menu 103.

Figure 2:
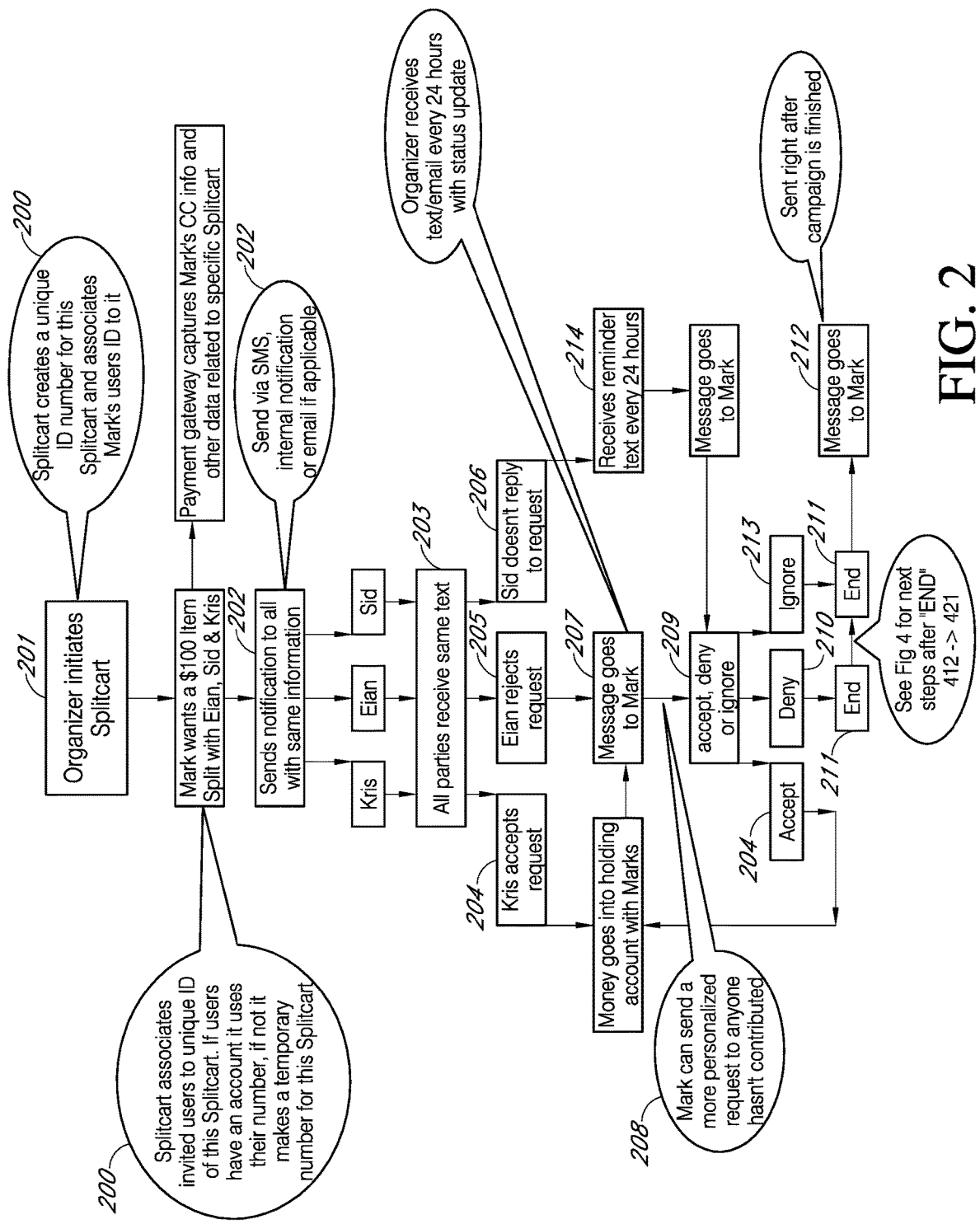
FIG. 2 is an overview of one embodiment of the Splitcart process as disclosed herein.

FIG. 2 is an overview of one embodiment of the Splitcart process as disclosed herein. In FIG. 2 we see a single organizer (Mark) and three (3) Splitters or Contributors (Kris, Eian and Sid). The organizer initiates the process 201. Splitcart will create unique user ID's for all parties involved 200. Through the process defined in FIG. 1 but may vary from this process as iterations and development of the application may dictate certain paths and or parameters, the organizer 212 sends an SMS message using Apple frameworks, and if applicable, the Splitcart system 100 sends a notification 202, which may be an email or other electronic message, to the three (3) splitters 105(*a*) who may contribute to the purchase of the gift selected by the organizer 212. All parties will receive the same information 203. Upon receiving the invitation there are at least three (3) conceived outcomes (204, 205 and 206), without limitation or restriction. The offer is accepted 204, the offer is rejected 205, and the offer is ignored 206. Each conceived outcome has a particular path which will be followed. All paths will have automated responses produced by the application or website which will assist the organizer 212 in the ultimate goal of collecting all the funds for the item selected and placed in the Splitcart 100.

When a person (as potential contributor or "splitter 105*a*) receives an invite for a Splitcart 100, and if the splitter 105*a* has the application on their phone the invite link (see above) will open up to the Splitcart details page and present the detailed photos and description of the selected product 117 being ordered. If the person does not have the application on their phone and they have an iOS device the link will direct them to the app store. If the person does not have an iOS device the link will open to a web application which will offer the same user experience. The amount they owe, the person who invited them (along with a telephone number and/or email of this person) as well as a total number (or could be the list of names) of those also contributing to the item. The user will have the opportunity to either accept or decline the Splitcart. Upon acceptance 204 the user will simply go to the payment screen and acknowledge their portion. Upon declining 205 the Splitcart the app will thank them and display an exit message. Either accepting or declining a Splitcart 100 invitation will send a notification to the organizer 212 of the Splitcart 207. If accepted, the splitter 105*a* will be moved to the participated column in the specific Splitcart's history, if declined the splitter 105*a* will be moved to declined. If declined, the organizer 212 can simply select the person's name and the Apple framework for SMS will appear with that person's number loaded as well as a predetermined message 208 which can be manipulated and have another link to the Splitcart in question.

Figure 3:
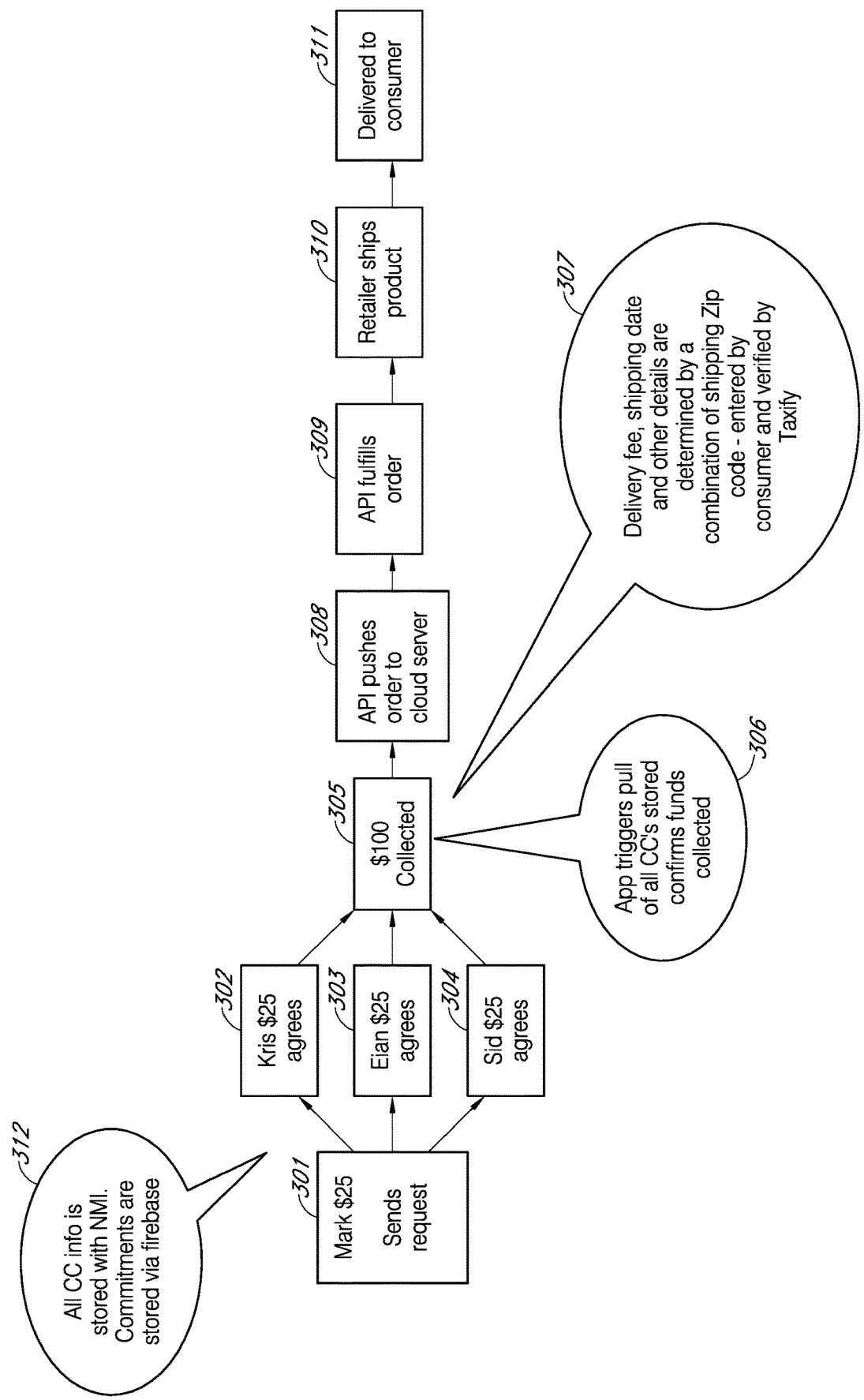
FIG. 3 is a process map of a flow of money and order processing as it relates to the Splitcart process as disclosed in FIG. 2.

If the outcome of the invitation is ignored 206 the app or website will automatically send a reminder to the Splitter/Contributor 105*a* every 24 hours. This only happens if an email is provided during the invite OR if the invited splitter 105*a* has a previously created Splitcart account then in app notifications will be sent 214. The organizer 212 will receive a status update every 24 hours in the form of a notification which would lead back to the Splitcart in progress. From here the organizer 212 can choose to send another invite via texting as mentioned above 208. Upon receiving final requests from the organizer 212 both the rejected party and the ignored party will have a final chance to accept, reject or ignore the offer 209. If accepted, then they follow the same path previously defined in 204. If a final request is denied 210 then 'END' 211 happens for the Splitter/Contributor 105*a* and a message goes to the Organizer 212. If ignored during the final process 213 then 'END' is followed 211 and a message goes to the organizer 212. For 211 END then the process follows the path laid out in FIG. 4 from 413 through 421. FIG. 3 is a process map of the flow of money and order processing as it relates to the Splitcart process illustrating the organizers 212 initial request 301. The transaction 304 will be conducted with a 3rd party payment gateway. The organizer 212, Mark in this example, will generate a request 301 to initiate the process of Splitcart 100 and send out invitations 313 to the Splitters/Contributors 105*a*. In this example all three (3) Splitters/Contributors 105*a* are giving an equal amount via accepted offers 302, 303, and 304, respectively. Upon fund confirmation 305, the backend system will trigger the final pull of the funds through a 3rd party gateway service (Fund API) 306. Upon the successful collection of funds for any given Splitcart 100, after the application gatekeeper (such as firebase for Google) has received acknowledgement from the third party credit card security system (such as NMI) that the funds have been verified, the gatekeeper application initiates the process of order automation 308 and execution 309 across the network/internet. The retailer which the selected product 117 is ordered from ships the product 310 and the item is delivered 311 to the consumer which could through a number of shipping options. All things related to shipping, delivery charge and tax are done through a marriage of technologies driven by the app, 3rd party sources and the retailers 307.

Based on the diagrams and flowcharts provided, one of ordinary skill will understand that when a Splitcart is successfully executed and the product has arrived at its destination (verified by tracking) the organizer receives an internal notification asking if the receiver has received the product. If the user says "no" then the app will log the response and ask again in 24 hours. The user will have the option to change the notification from 24 hours to 48 hours or 72 hours. Once the user says "yes" that the receiver has received the product the app will give a pop up requesting the receivers email. If the email is not readily available, the user can come back to the Splitcart details and bring this pop up manually or it will ask again in the predefined timeframe. Once the email is provided and the user hits "send" the back-office system will send an email to the receiver with all the splitters names, verbiage about Splitcart and a link to follow for returns. A notification will go to the database which will enact a crawler to spin up the return process through the company account. Once the return is validated by the retailer a shipping label will be generated and emailed to the receiver's email. It will also be available in the iOS app and the web app.

The receiver will be responsible for ensuring all requirements of the return are true as well as affixing the return label and executing the shipping process. Once the item is returned successfully and the company has received confirmation of the funds returned to the account, the company will execute the Splitcart credit or digital gift card.

Figure 4:
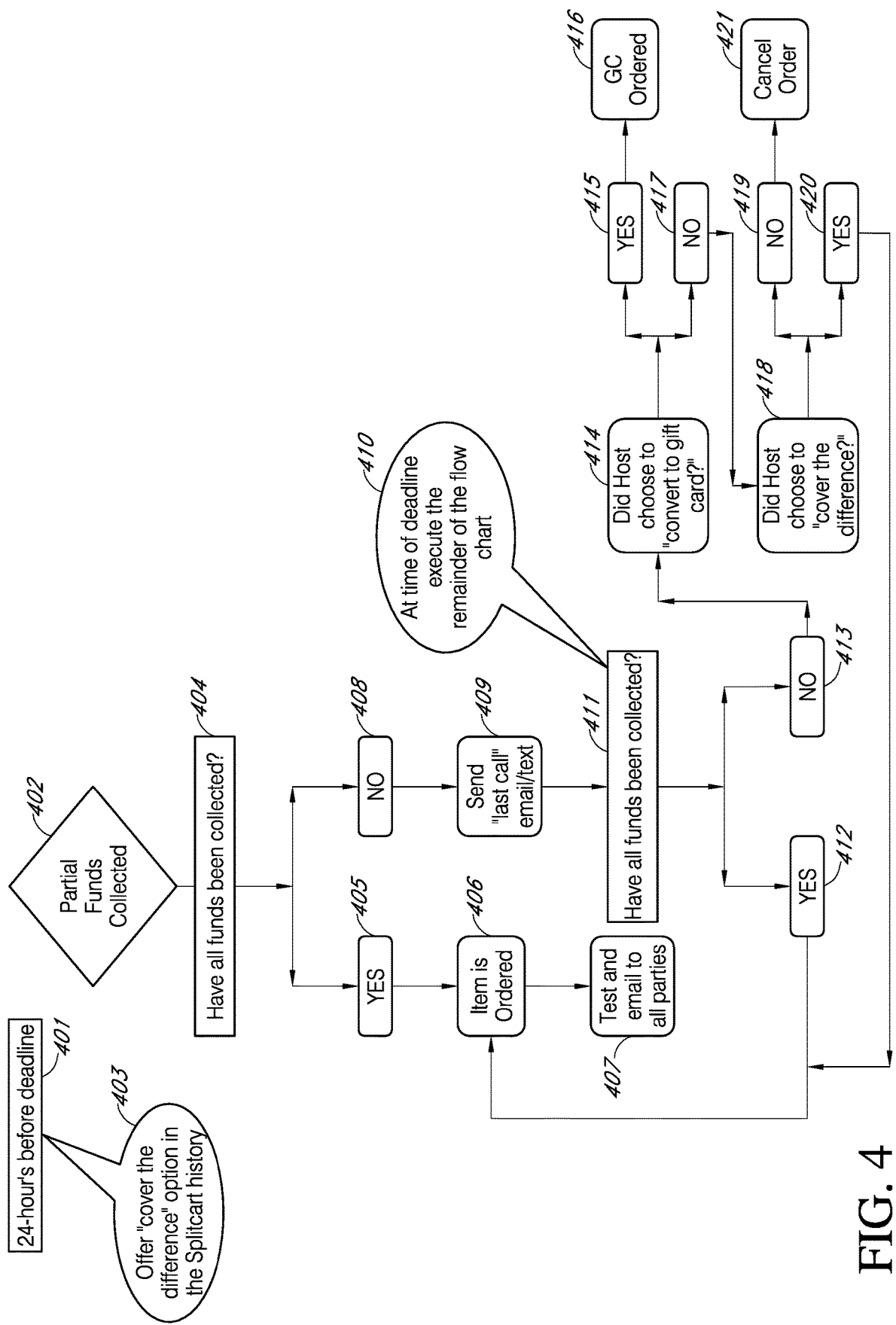
FIG. 4 is a high-level overview of a Splitcart process of what may happen if all the funds are not collected for the item selected as disclosed herein.

Upon selecting the link it will either take them to the iOS application (if installed), the app store if not installed or a web app if they do not have an iOS device. All process will work the same whether on a web app or the iOS app. The user will be presented with the guidelines of the return and an option to execute the return. The receiver will decide whether they wat to receive a Splitcart credit for the cost of the item or a digital gift card to a particular retailer. When the user choose to execute the return they will fill in the pertinent information and hit send. A FIG. 4 provides an overview via flowchart of the process when the funds are not collected for the item selected to be purchased. As previously stated, the organizer 212 will get notifications every 24 hours about the status of the Splitcart 100. At any time, the organizer 212 can go into the Splitcart history and resend an invite to anyone who has not committed. This process uses, but is not limited to or governed by, a 24-hour 401 window. 402 shows only a portion of the funds have been secured. Upon the arrival of the twenty-four (24) hour deadline the organizer 212 is given an option to cover the difference in the specific Splitcart details section 403. This would allow the organizer 212 to pay for any uncollected funds keeping the Splitcart in progress for completion. The system will notify the organizer 212 of this change via an internal app notification. The first trigger 404 is "have all the funds been collected?" If the answer is yes 405, and for whatever reason the order process was not executed, then the item is ordered 406 and a message is sent to the Organizer and the Splitters/Contributors 407. If the answer is no 408, assuming the 24-hour rule is implemented but it doesn't have to adhere to that exact time, the system will send out an automated 409 reminder to all parties involved via an in-app notification. First a notification is sent to the organizer 212 who can then send a (predefined) SMS messages to those who have yet to participate and if the user has an email on file the backend system will send that or if they have the application installed they too will receive an in app notification. At the deadline time for collecting funds 410 the system will ask the question again "have all funds been collected?" 411. If the answer is yes 412 then the path will execute back to 405. If the answer is no 413 then the system will check to see if the Organizer choose 414 to convert funds to a retailers gift card. (this option is always available to the organizer 212). If the answer is yes 415 then the gift card order is executed 416 and the system follows the path of any completed order. Upon this action an email will go out notifying all verified splitters of this action. If the answer is no 417 the system asks, "did the Organizer choose to cover the remaining balance due?" 418. If the answer is yes 420 the system moves to 405 to execute the order. If the answer is no 419 the system cancels all requests 421.

It should be understood that in another embodiment of the SplitCart 100 disclosed herein, when a new Splitcart is generated via the app a Splitcart details screen is created in the Splitcart history. The organizer can review all information and participants in this screen. At all times the organizer can choose to convert the funds collected to a gift card. Upon selection of this the system would generate and send a message to all of the selected receivers who have either committed or been unresponsive pre-loaded which states the intent of the organizer 212. At the end of the Splitcart collection time the application would pull all the funds of those who participated and would order the gift card and ship it to the applicable location. When the timer gets down to 24 hours until the end of a Splitcart, the organizer 212 will get an in-app notification which will link them back to the details screen. An option will be provided allowing the an organizer to "cover the difference". The Splitcart system will show what the organizer 212 must contribute (above and beyond what has already been committed) in order to complete the order process. If the organizer 212 agrees to this amount, at the end of a Splitcart, whatever funds are needed to satisfy the Splitcart order 100a will charged to the organizers credit card. In the event someone else contributes in the last 24 hours the app will do the math accordingly and will always display correct information. This will be a private event that will not trigger a notification to other participants. The action will be logged in the data base as well as with the credit card processor.

Figure 5:
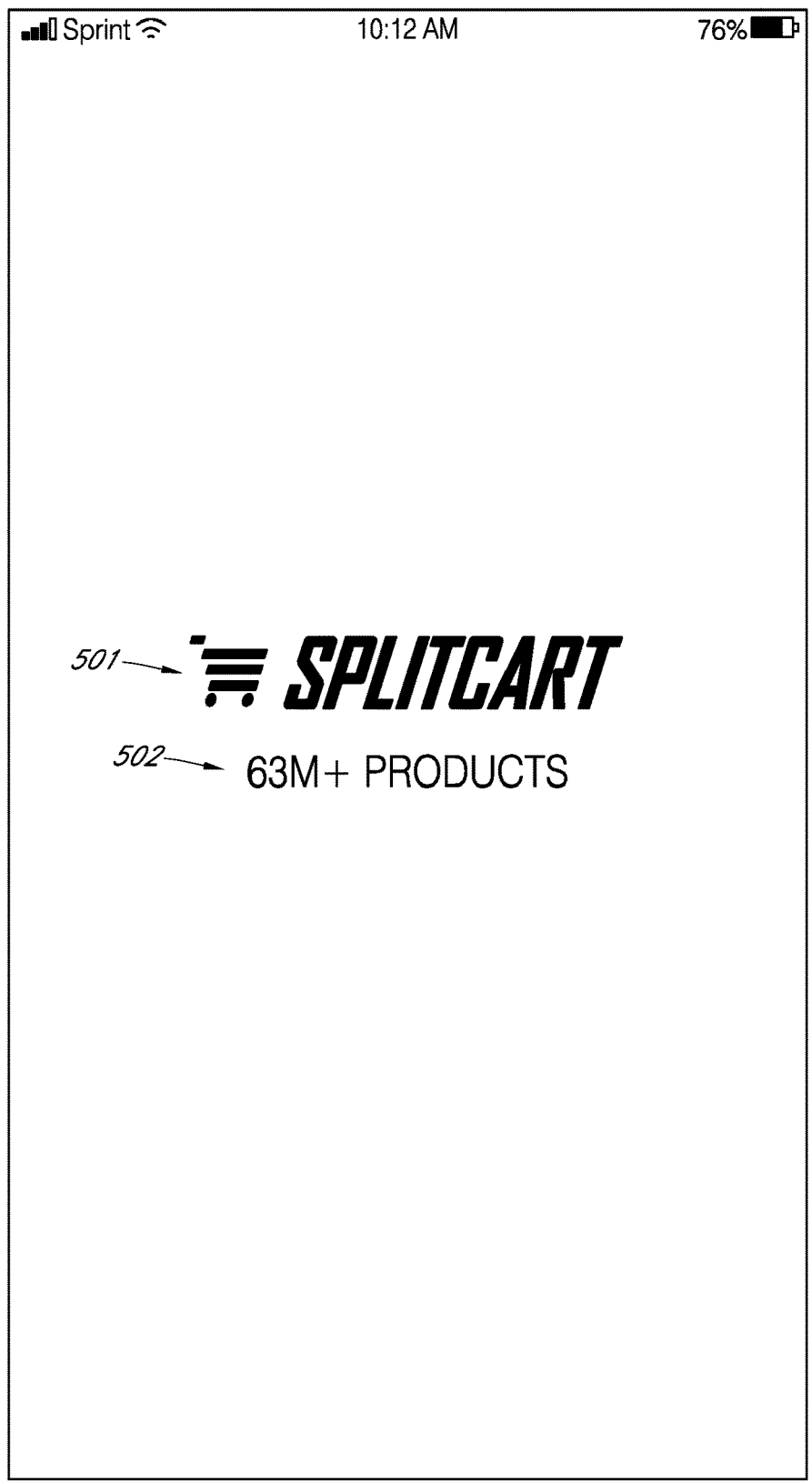
FIG. 5 is an overview of a forward-facing experience that the user would have once downloaded the Splitcart application as disclosed herein.

FIG. 5 shows a screen shot of the forward-facing experience the user 113 would have once the user launches the Splitcart app—similar experiences would and could be represented in a web-based experience. The screen would have a motion graphic loading the Splitcart "cart" aspect of the logo 501. The screen would have a counter 502 that showed the ever growing number of products in the Splitcart inventory. This screen would automatically close after a pre-determined time.

Figure 6:
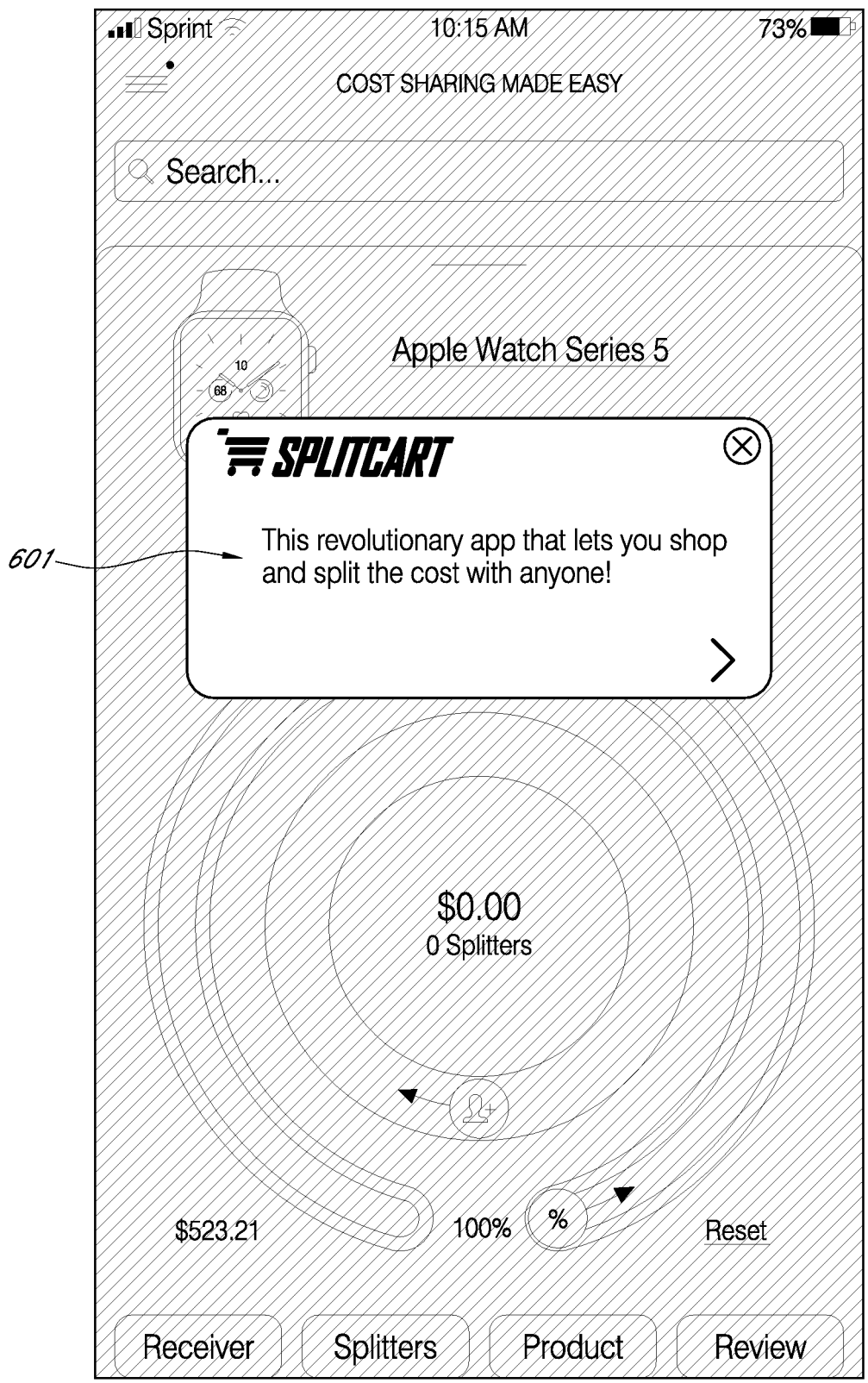
FIG. 6 is an overview of a coach mark of the Splitcart application as disclosed herein.

FIG. 6. shows the opening coach mark 102. This is one of many coach marks 102 the user 113 will see to help guide them through the Splitcart process 100. Behind the screen, for each coach mark 102, will be relative information to the coach mark 102. There will always be an exit "X" in the upper right corner of the coach mark 102. These will only be offered the first two (2) times the app launches. There will be a way to access this path again through the settings menu.

Figure 7:
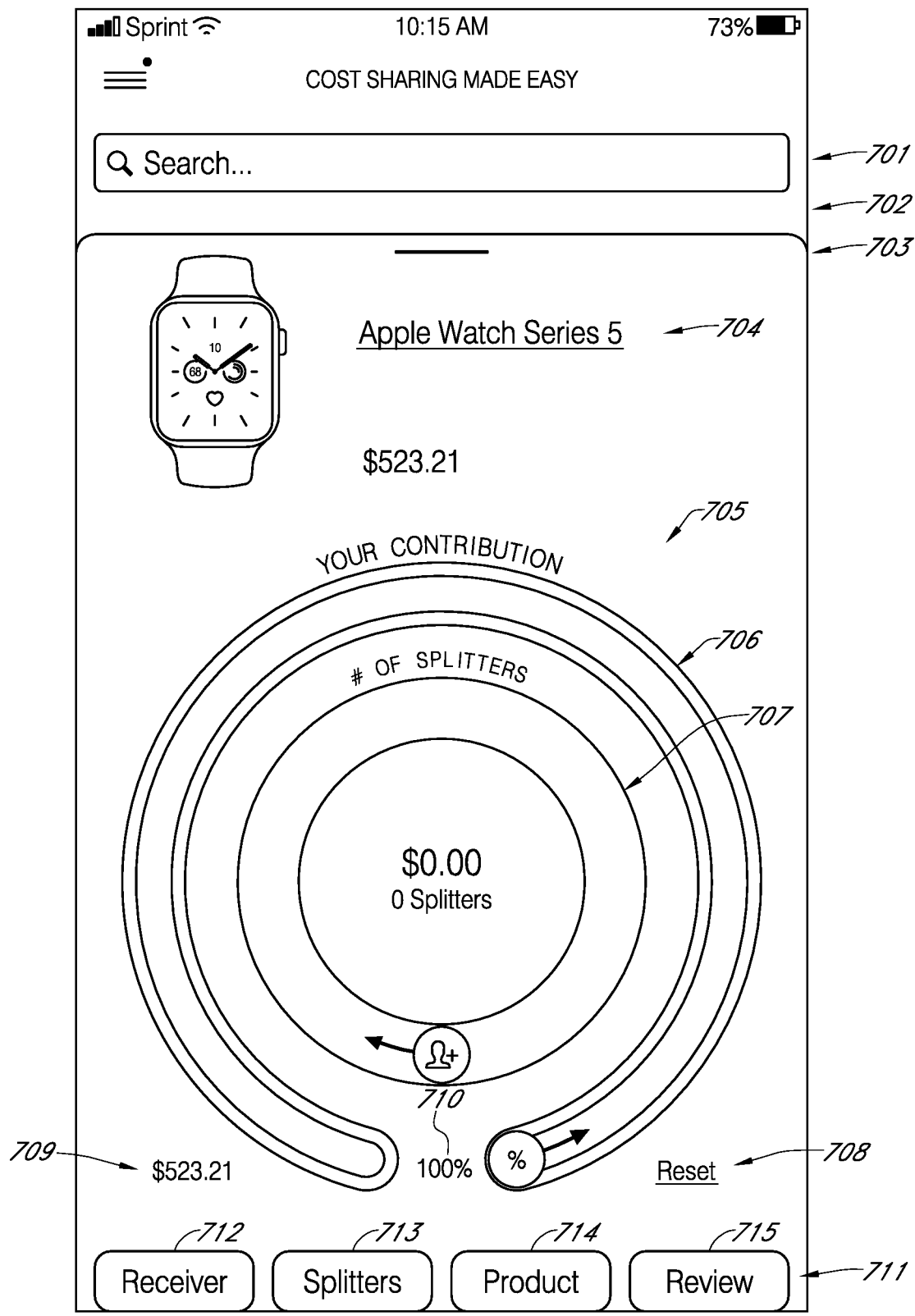
FIG. 7 is an example of what a home screen will look like after the coach mark's are completed. This is an overview of the heart of the app, the forward facing screen which offers multiple points of access to the entirety of the app as disclosed herein.

FIG. 7 is an example of what a home screen (103 in FIG. 1) will look like after the coach mark's 102 are completed. This is an overview of the heart of the app, the forward-facing screen which offers multiple points of access to the entirety of the app as disclosed herein. As shown, this screen shows the user 113 a search bar 701 on the top of the page which allows a user 113 to manually type in products available for selection and purchase. Below this is where the predetermined categories 702 can be found. Categories can be used when the item being purchased is unknown or undecided. Overtop of this screen is a view model controller 703 which houses a carousel 704 of rotating best-selling items and the Splitcart cost calculator 705 (see 115 on FIG. 1). Upon launching the app the carousel will offer a user the ability to "see" what and how Splitcart 100 works through a series of examples in the Splitcart cost calculator 705. Below the carousel of items is the Splitcart Cost Calculator 705. There are two rings associated with the Splitcart Cost calculator, the outer ring 706 and the inner ring 707. The outer ring 706 gives the organizer 212 the ability to set his or her static amount they wish to contribute to the selected product 117 to be purchased. If the organizer 212 does not choose a static amount the outer ring 706 will move in equal accordance to the inner ring's 707 selection. Such as: for everyone splitter 105a added the total cost of the item is divided by the organizer 212 and "x" splitters 105a to keep an equal proportion for all parties involved.

The calculator financially rewards the organizer 212 for every splitter 105a added with a maximum reward of a $0.00 contribution amount for the organizer 212. This ring, if actuated by the organizer, will control the process throughout the rest of the payment structure of the process unless the organizer 212 presses the reset 708 button. The organizers dollar amount for the contribution (709) and percentage (710). The inner ring 707 is where the organizer 212 can see what the cost will be for all parties involved by "adding" splitters to the equation. As the organizer spins this ring, fictitious splitters are added to the Splitcart 100. This ring is nothing more than a cost calculator and has no bearing on final numbers. Below the cost calculator 115 are shortcut keys 711 for executing the process of a Splitcart. These shortcut keys or shortcut buttons are designed to be used in any order and each will have a different impact on the app. Each key or button will load a new view controller with the pertinent information in it. These are designed to offer the user 113 control over the experience which allows for greater freedom throughout the app. Some of these actions, when completed, will have a direct impact on other screens, numbers, totals and calculations throughout the app.

Figure 8:
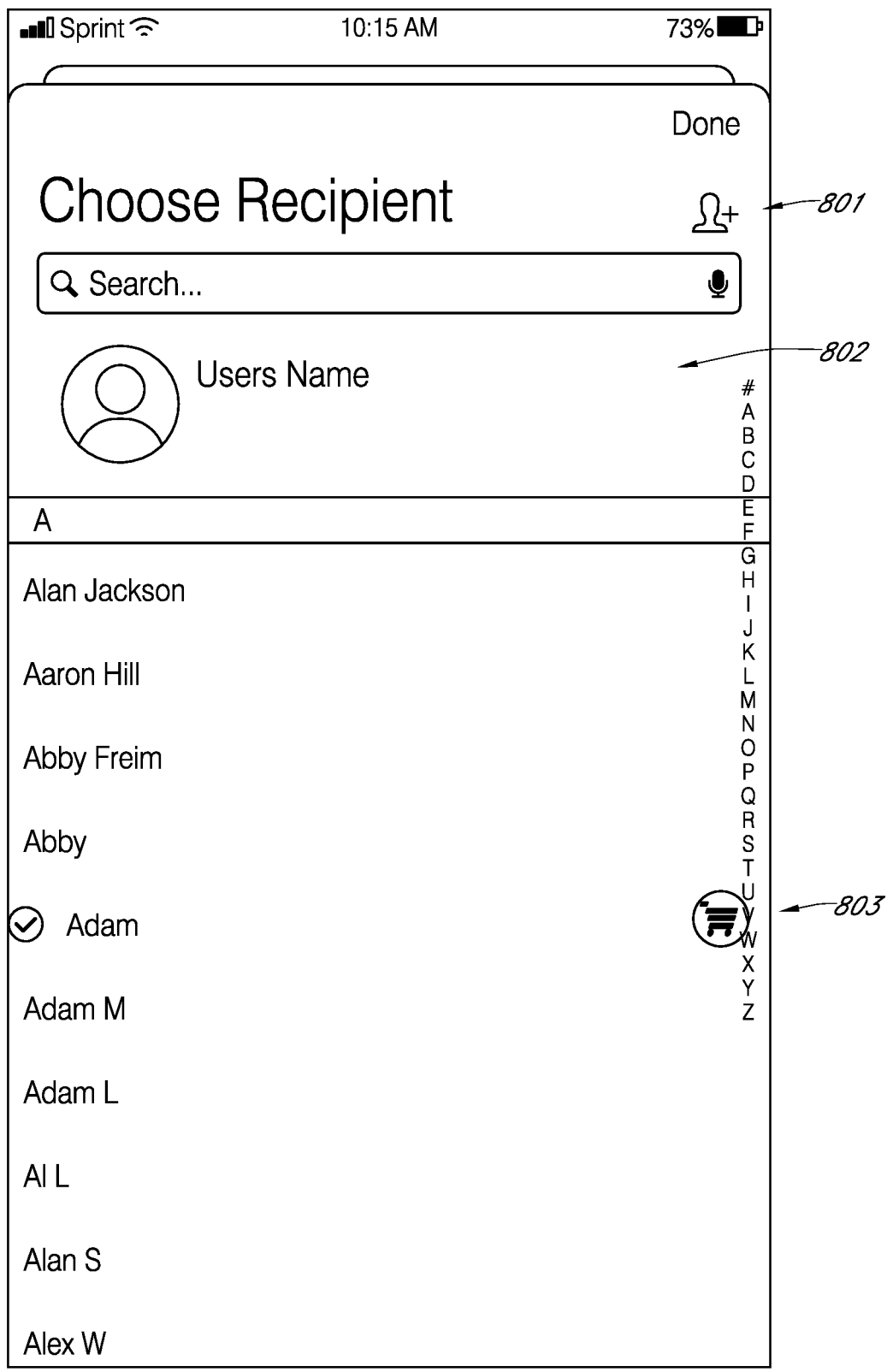
FIG. 8 is an overview of the receiver or choose recipients screen as disclosed herein.

Upon selecting the Receiver 712 button, the app will bring up a contacts view controller which will have the users contacts (if permission has been given) loaded into it (See FIG. 8). The user will choose from the list of names the person in which is set to receive the item selected for the Splitcart. There is a manual add button 801 for someone not in the user's contacts. There is a slide 802 which has the users contact data loaded at the top in the event that the person organizing the SplitCart 100 is the person receiving the item.

Figure 9:
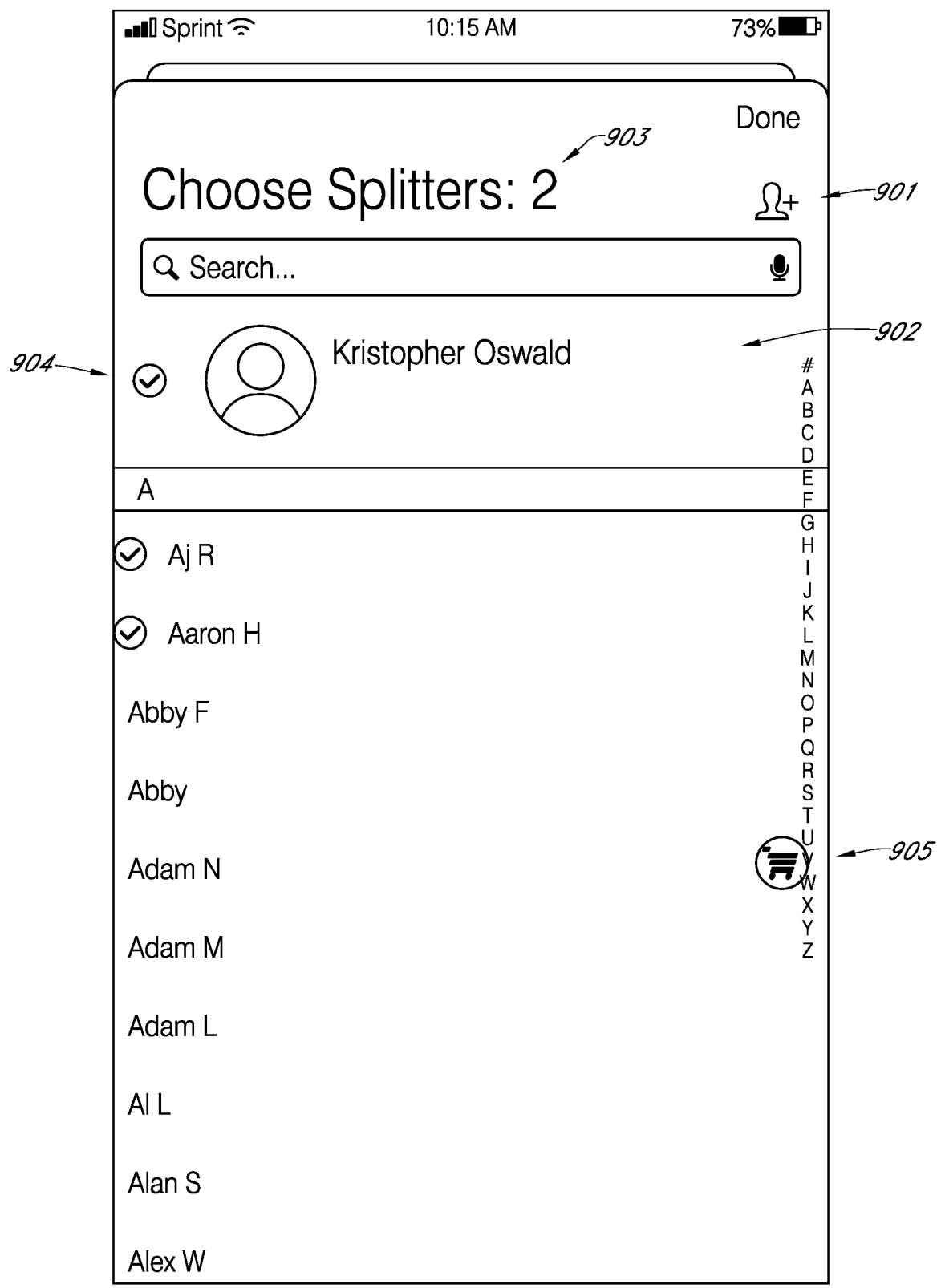
FIG. 9 is an overview of the splitter or choose splitters screen as disclosed herein.

Upon selecting the Splitter 713 button, the app will bring up a contacts view controller which will have the users contacts (if permission has been given) loaded into it (See FIG. 9). The user can choose anywhere from one (1) person to their entire contact book as Splitters. There is a manual add button for someone not in the user's contacts 901. There is a slide 902 which has the users contact data loaded at the top in the event that the person organizing the SplitCart 100 is the person receiving the item. As splitters are selected there is a counter 903 at the top of the screen to maintain a selected count. When one person is selected the organizer is automatically selected 904. Upon selecting the appropriate number of splitters, the user exits the screen with the "done" button. Upon this action the SplitCart 100 calculator is updated with the correct number of splitters. The user can still take manual control of the SplitCart 100 cost calculator to see what different scenarios will look like but the number of Splitters that have been manually selected ultimately dictate what the preview screen represents for cost.

Upon selecting the Product button 714, the app will lower the home view controller (home screen) and will expose the category view controller (see FIG. 10) This will also give access to the search bar for manual searching. Upon selecting the Review button 715, the app will bring up the preview view controller (see FIG. 15) where the SplitCart 100 process is laid out in very simplistic fashion.

FIG. 8 is a basic contacts manager displaying potential Recipients of the gift effort. The users contacts, once permission is given, will be displayed here. There is a manual add button 801 for someone not in the user's contacts. There is a slide 802 which has the users contact data loaded at the top in the event that the person organizing the SplitCart 100 is the person receiving the item. The application will recognize people in the users contacts which have the SplitCart 100 app installed and display a colored SplitCart 100 logo next to their names 803.

FIG. 9 is a basic contacts manager displaying potential Splitters. The users contacts, once permission is given, will be displayed here. There is a manual add button 901 for someone not in the user's contacts. There is a slide 902 which has the users contact data loaded at the top in the event that the person organizing the SplitCart 100 is the person receiving the item. As splitters are selected there is a counter 903 at the top of the screen to maintain a selected count. When one person is selected the organizer is automatically selected 904. The application will recognize people in the users contacts which have the SplitCart 100 app installed and display a colored SplitCart 100 logo next to their names 905.

Figure 10:
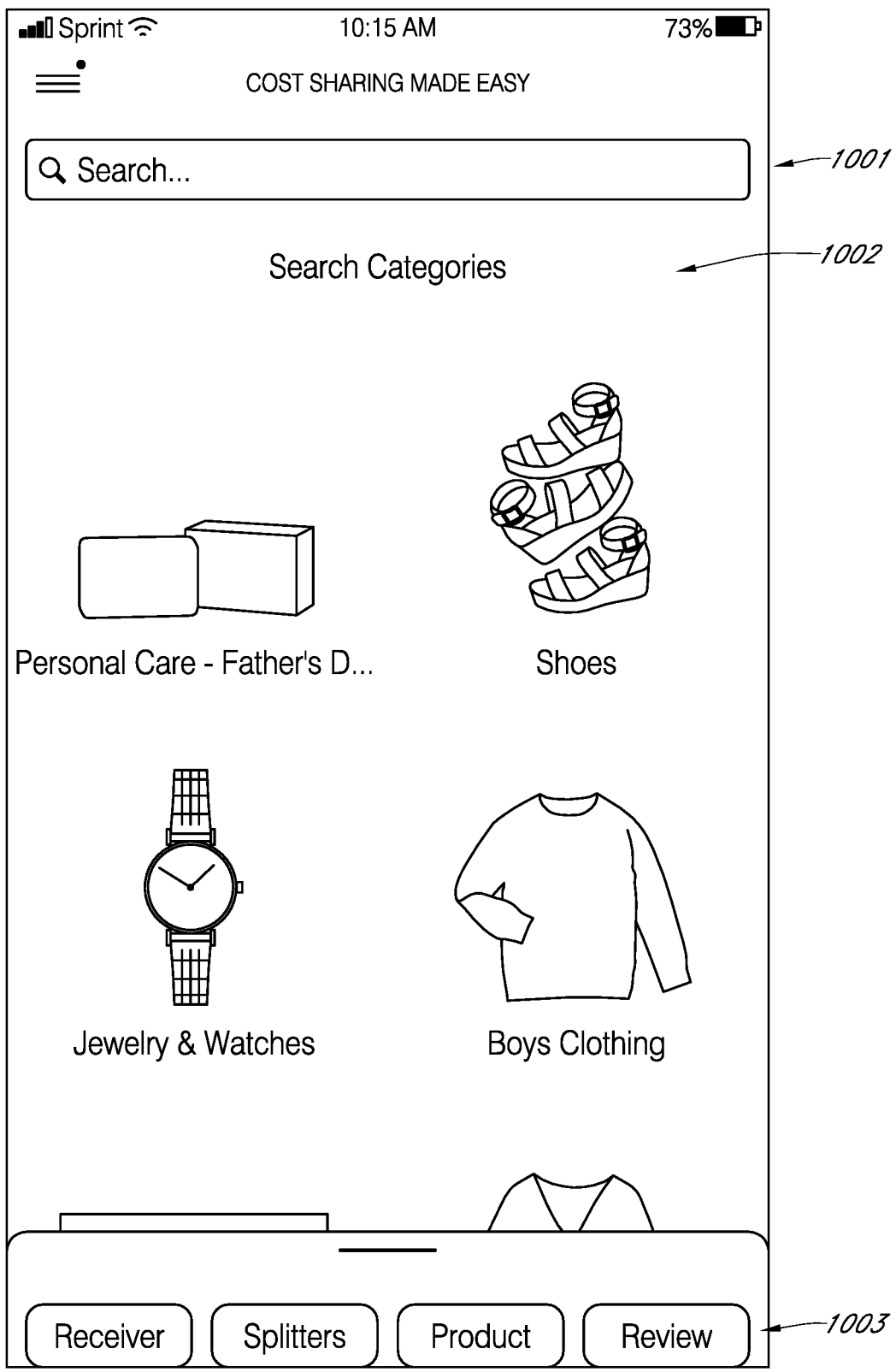
FIG. 10 is an overview of the manual search and category search screen as disclosed herein.

FIG. 10 is the product search screen. This screen holds multiple view controllers and is the starting point for a user's shopping experience. A manual search bar 1001 gives the user the ability to perform a scrape for any key word typed in. The categories area 1002 is a preloaded selection of items determined by the scrape of the retailers categories. The user can choose these categories to help decide or to help choose the best gift for the SplitCart 100. At the bottom of the page is the home view controller and the 4 short cut keys 1003 which will take the user to the marked areas of the application.

Figure 11:
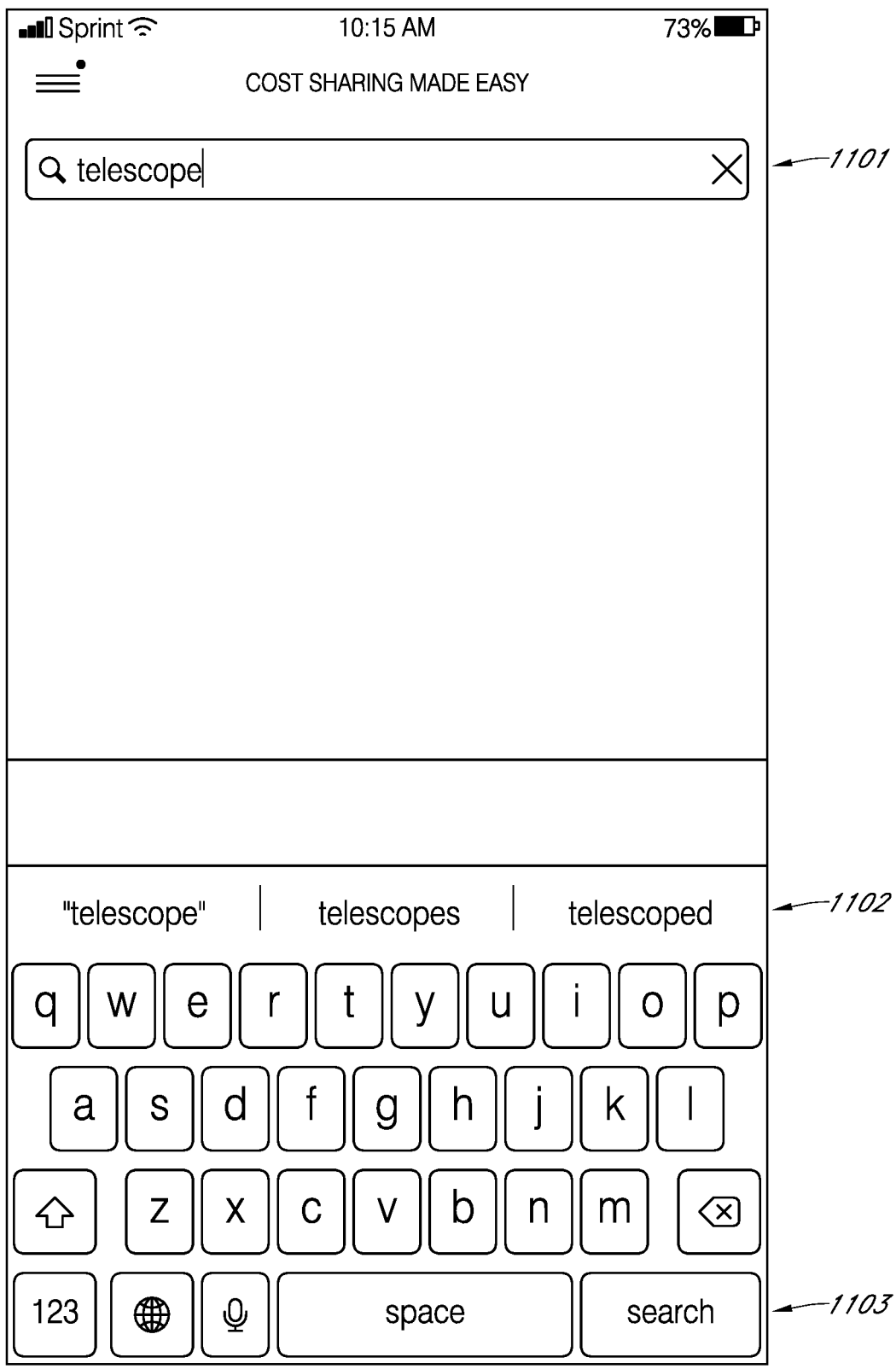
FIG. 11 is a representation of a manual search with autofill being utilized.

FIG. 11 is representation of a user typing in an item in the manual search bar 1101. By using the Apple framework for auto complete 1102 the users experienced is enhanced. The user would then press the search 1103 button to initiate a scrape of the retailers websites.

Figure 12:
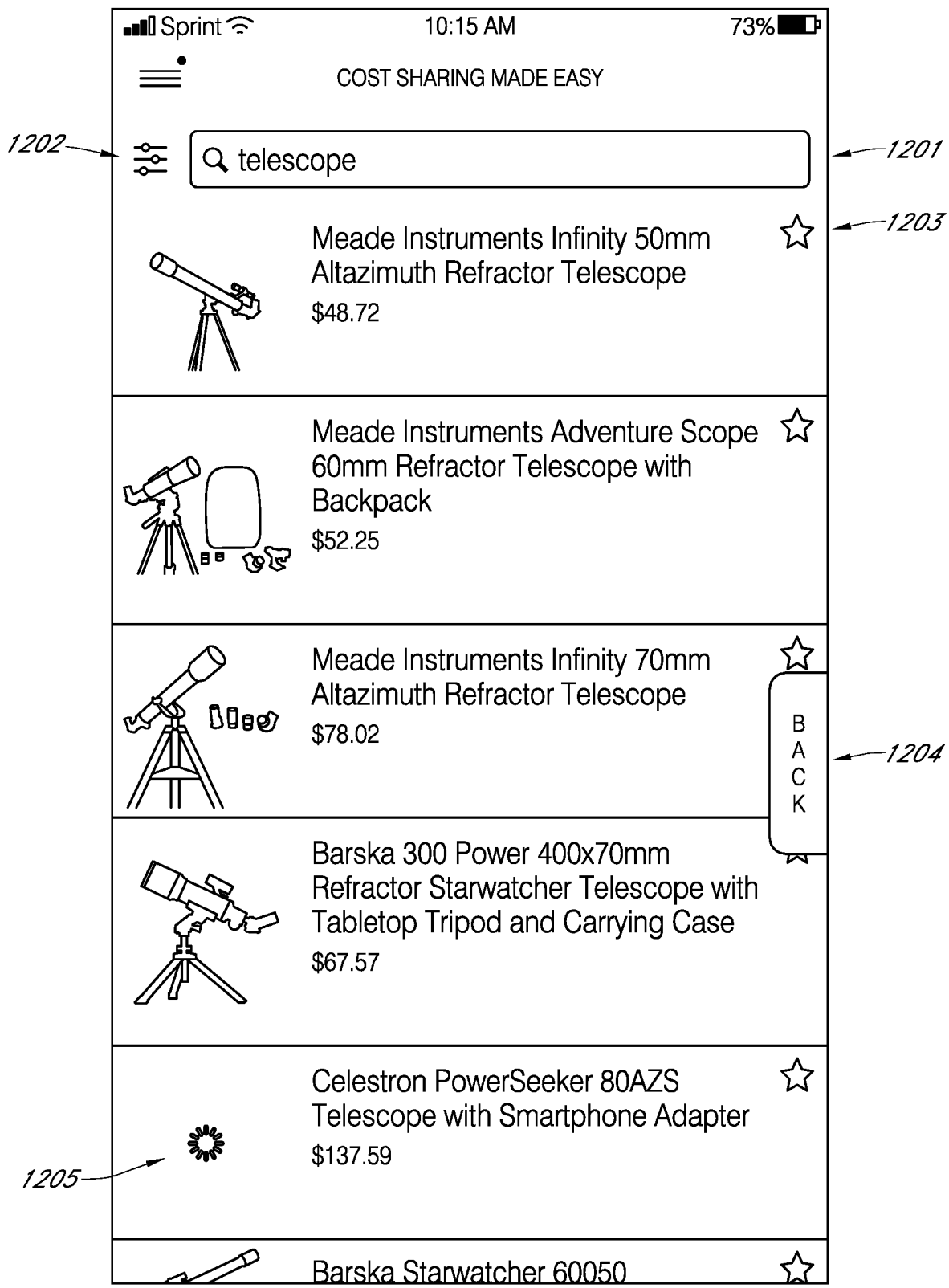
FIG. 12 is an overview of the search table view controller disclosed herein.

FIG. 12 is the search table view controller and is found after the consumer does a search from either a manual search or using the categories feature. The manual search bar 1201 stays at the top of the screen and a filter button 1202 is added to the left. The filter allows a user to sort the items in the table view by a myriad of different ways, not exclusive to but an example would be pricing, size, color, etc. Each product has the title and price displayed. The user can press the star 1203 to save the item to their favorites menu (which can later be accessed in the settings). The back tab 1204 allows the user to slide the view controller to the left and gain access to the previously visited screen. In the event a product image fails to load or is slow loading an indicator is offered 1204. To move forward the user simply chooses an item by pressing anywhere in the items window.

Figure 13:
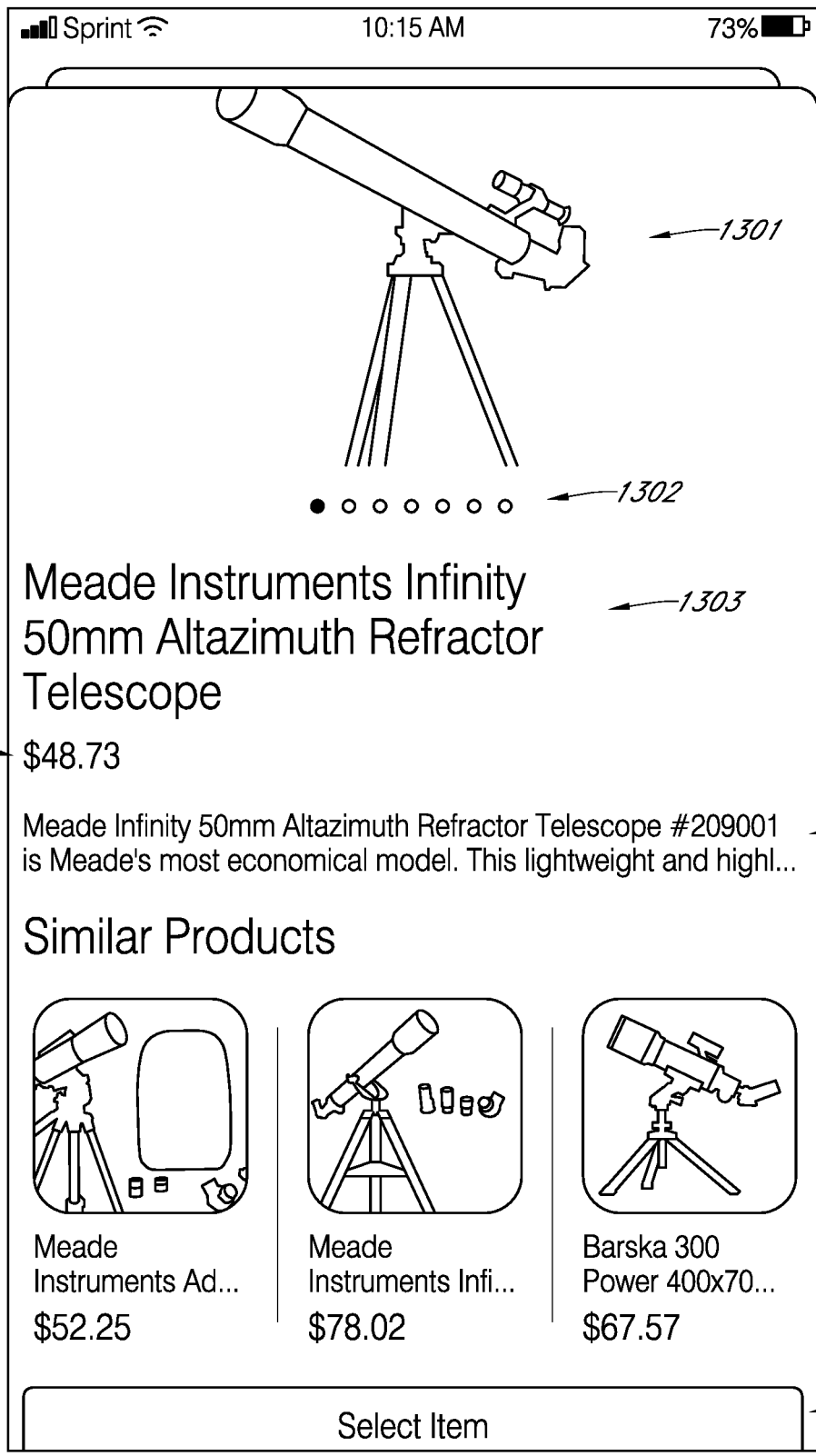
FIG. 13 is an overview of the select items screen as disclosed herein.

FIG. 13 is the select item screen. This function of this screen is to display the product chosen after the table view screen. In this screen the user will be able to view all applicable images and videos (if available) 1302 of the product. A detailed description 1303 and pricing 1304 will be disclosed. Furthermore, if the scraper finds that the choose product has variables, these variables will be displayed. Variables can range in type, size and volume and the area to display such variables is dynamic. The user is provided a complete product description 1305 for review. The user will also be provided with a list of similar products 1306 to choose from. The similar products search is theoretically infinite as every time a product is chosen and new scrape of the web goes out to find other similar products to the new selected. This is very beneficial as it would allow the user to go find products, they were unaware of and perhaps even products in different categories than the main product. The user would then select the button labeled "choose" or "select item" 1307 which would take them back to the home screen.

Figure 14:
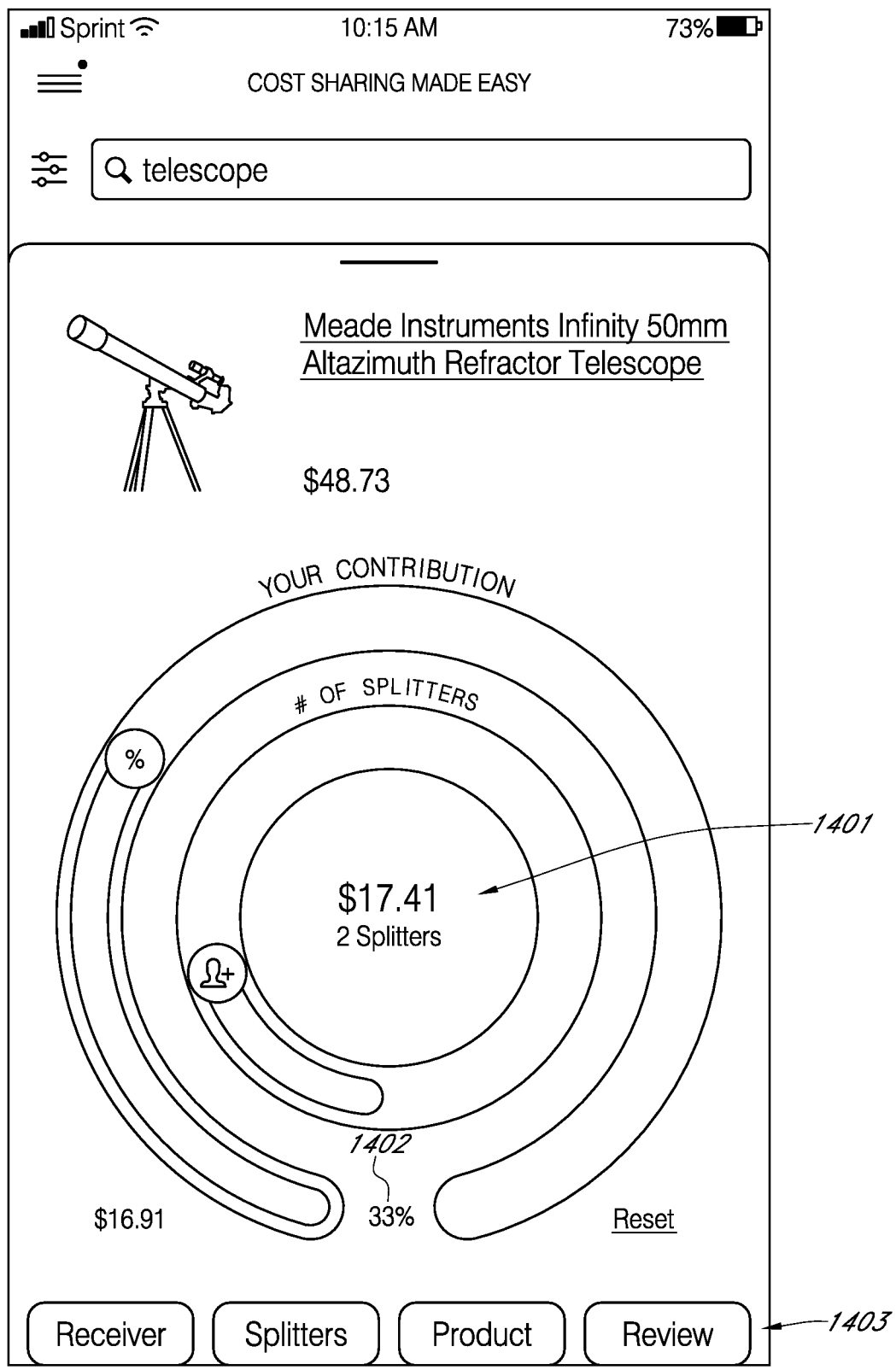
FIG. 14 is a representation the home screen once a specific item is selected and the organizer has selected a determined number of splitters as well as the inner and outer rings of the Splitcart cost calculator as disclosed herein.

FIG. 14 is the home screen with the item from the select item screen placed into the view model controller. The action of selecting a specific item would cease the carousel from rotating through items (see FIG. 7). In this example we see the organizer has chosen two (2) splitters 1401 for calculating cost. The organizers participation level goes to 33% 1402 which would match an even portion of two splitters and one organizer; totaling 3 people splitting the cost. At the bottom of the page is the home view controller and the 4 short cut keys 1403 which will take the user to the marked areas of the application. Upon completion of each section these buttons will turn green indicating they are completed.

Figure 15:
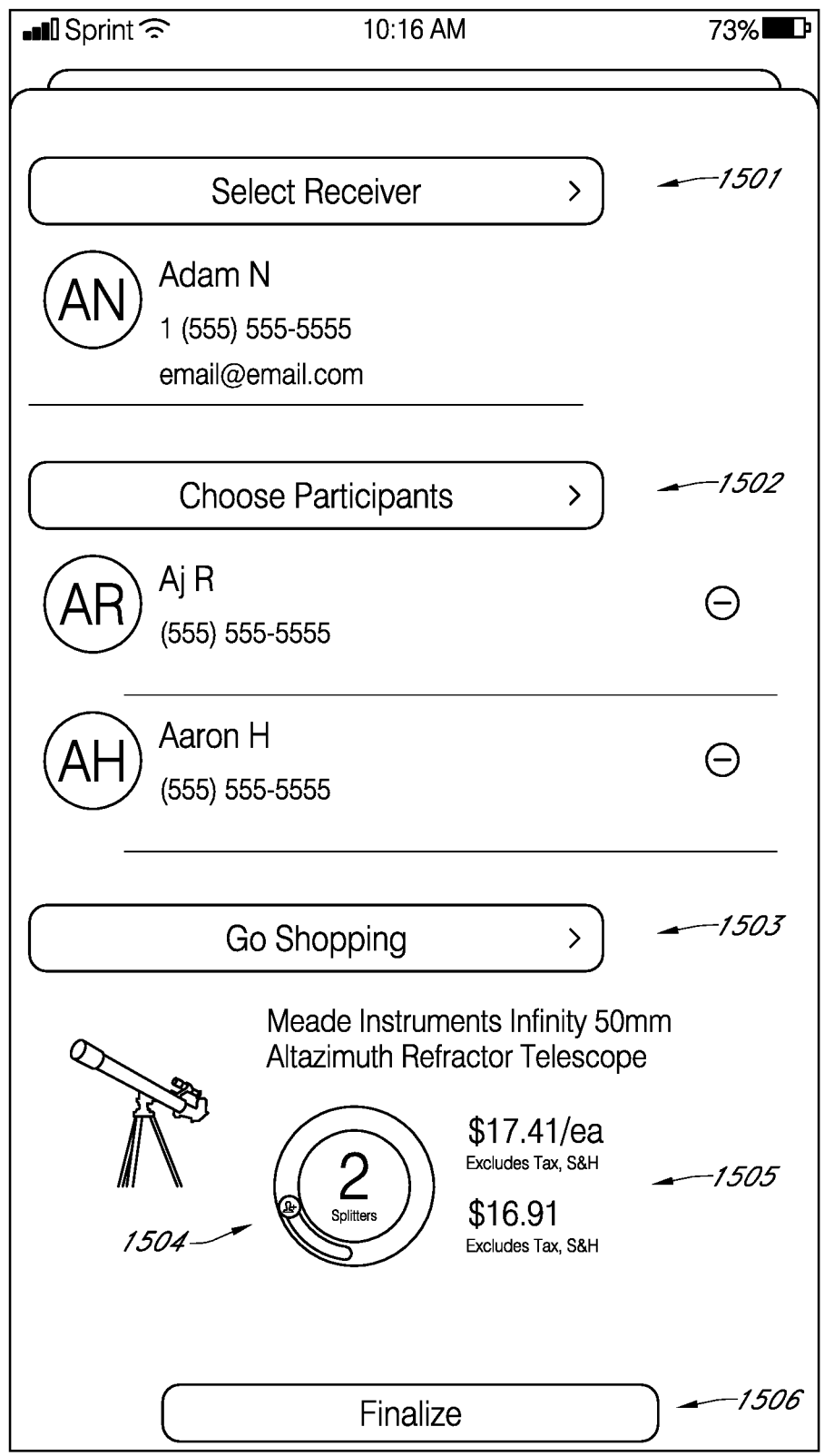
FIG. 15 is a representation of a review screen as disclosed herein.

FIG. 15 is the preview view controller screen. The user is shown an option to select receiver 1501, choose participants 1502 or go shopping 1503. Each button represents the button from the bottom of the home screen and actuates the same process (see FIG. 7). As these areas are filled out the app will appropriate the correct information in each field. When a receiver is selected that person's information will appear in the select receiver section 1501. As splitters are chosen, they will be represented in the choose participants section 1502. This section can grow dynamically and has a view controller for easy scrolling. Once a product is selected it will appear under the go shopping section 1503. The Go Shopping section will also, when the other fields are satisfied, have an image of the SplitCart 100 cost calculator 1504, the number of splitters chosen 1504 and a representation of est. per person costs 1505. As each section is satisfied, they will turn from a blue to a green indicating fulfillment. Once all areas are satisfied the bottom Finalize 1506 button will turn green indicating moving forward is possible.

Figure 16:
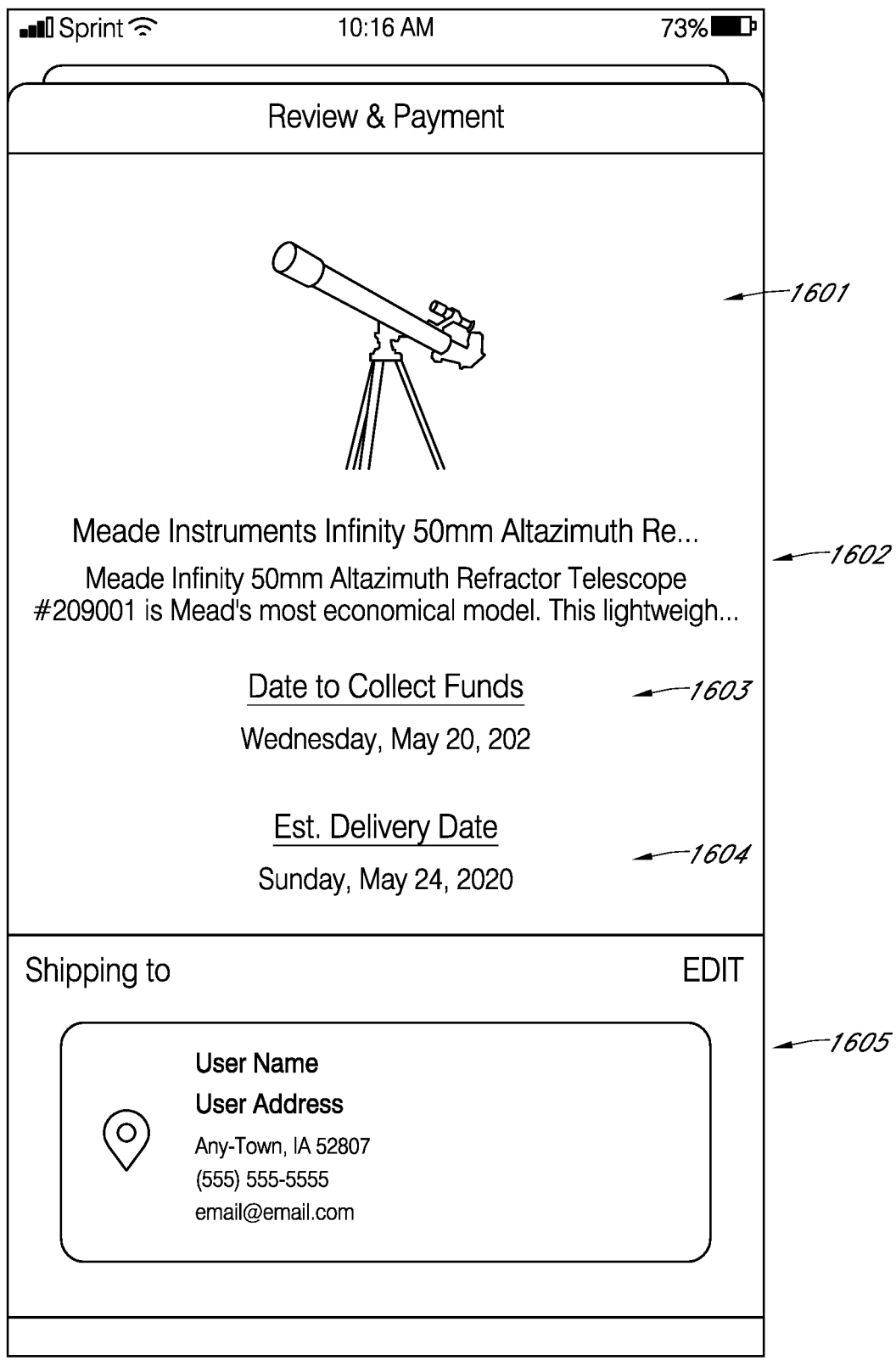
FIG. 16 is a representation of the first half or top of the final payment screen as disclosed herein.

FIG. 16 is the first half or top portion or the payment view controller screen. Here the user is shown the main product image 1601 for the SplitCart 100 100 as well as the products title and description 1602. The user is shown a date to collect funds which is predetermined at 3 calendar days 1603. The user will also see an estimated date of delivery 1604 for the item selected for purchase. This date is pushed back 4 days after the final date to collect funds. This date is merely an estimate. The user has the ability to choose a shipping address 1605 by pressing the edit button. The user will be given the option to add this address as a default shipping address. This would not replace the users inputted home address but would act as a secondary shipping address. The users profile data will be used as the default shipping address. The address provided here will be the zip code used to calculate both shipping cost and sales tax. The users profile zip code will used as the base zip code for all scrapping and sales tax calculation up to this point.

Figure 17:
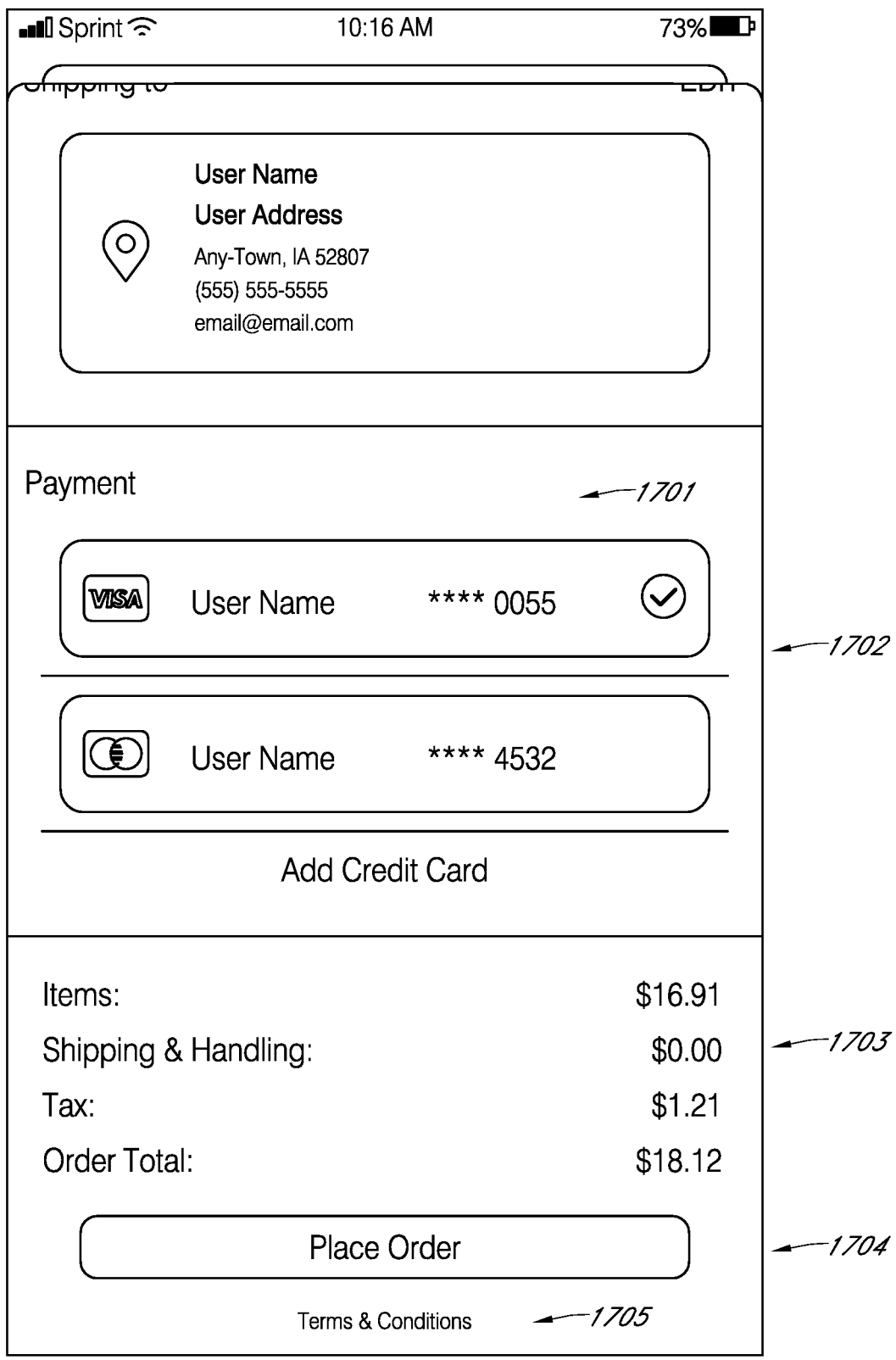
FIG. 17 is a representation of the second half or bottom of the final payment screen as disclosed herein.

FIG. 17 is the second half or bottom portion of the payment view controller screen. Here the user is shown a payment section 1701. The first time through this section will be blank and the user will need to add a credit card. Upon selecting this area a pop-up will appear asking for the credit card number, expiration date and CVV code. This data will be saved via a 3rd party payment gateway. They will then see what type of card is being used and the last 4 digits of the card 1702. Multiple cards may be stored with the system. Only once card may be used to execute a SplitCart 100. Below is a break down of the numbers. The users portion due of the item cost, shipping & handling, sales tax and order total 1703. When the user presses place order 1704 the Apple framework for SMS messaging loads in a new view controller with a predetermined message and the list of phone numbers provided via the contacts screen for choosing Splitters.

Once the message is sent the action is done and a thank you screen appears. At the bottom of the page the terms and conditions are clearly labeled 1705.

Figure 18:
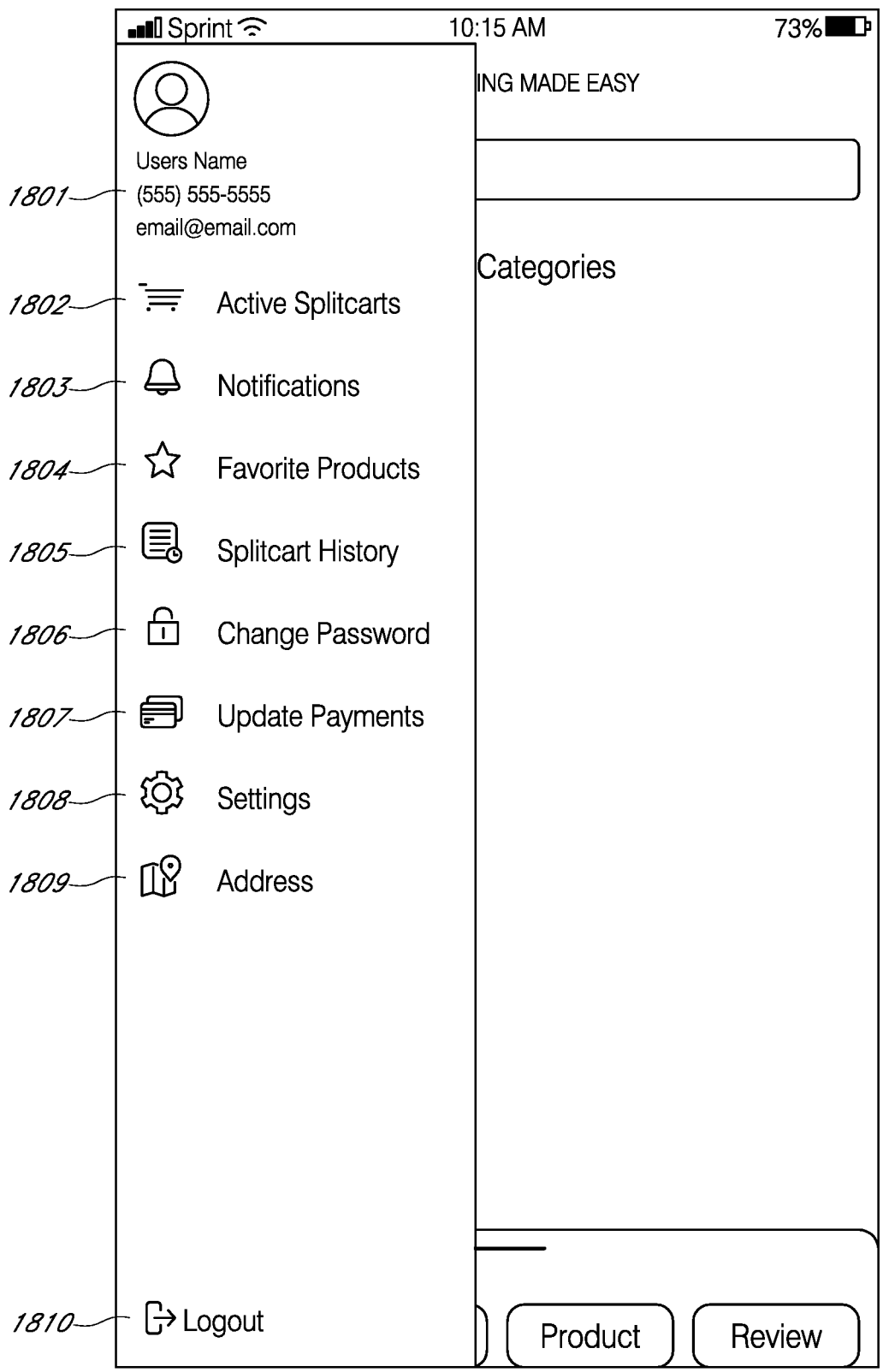
FIG. 18 is a representation of the hamburger or user option options disclosed herein.

FIG. 18 is a representation of the hamburger or user menu screen. The user can change their profile by clicking anywhere on their information 1801. Anything relative to active SplitCart 100s can be found by clicking 1802. Notifications can be found in 1803. Favorite products from the table view or select item screen can be found in 1804. Splitcarts that have been successful or failed can be found in Splitcart history 1805. Changing password can be done in 1806. Updating credit card payments or deleting credit cards can be done in 1807. Settings is where all personal settings can be modified 1808. Address is the users default shipping address and can be adjusted here 1809. Logout is as it says 1810.

Figure 19:
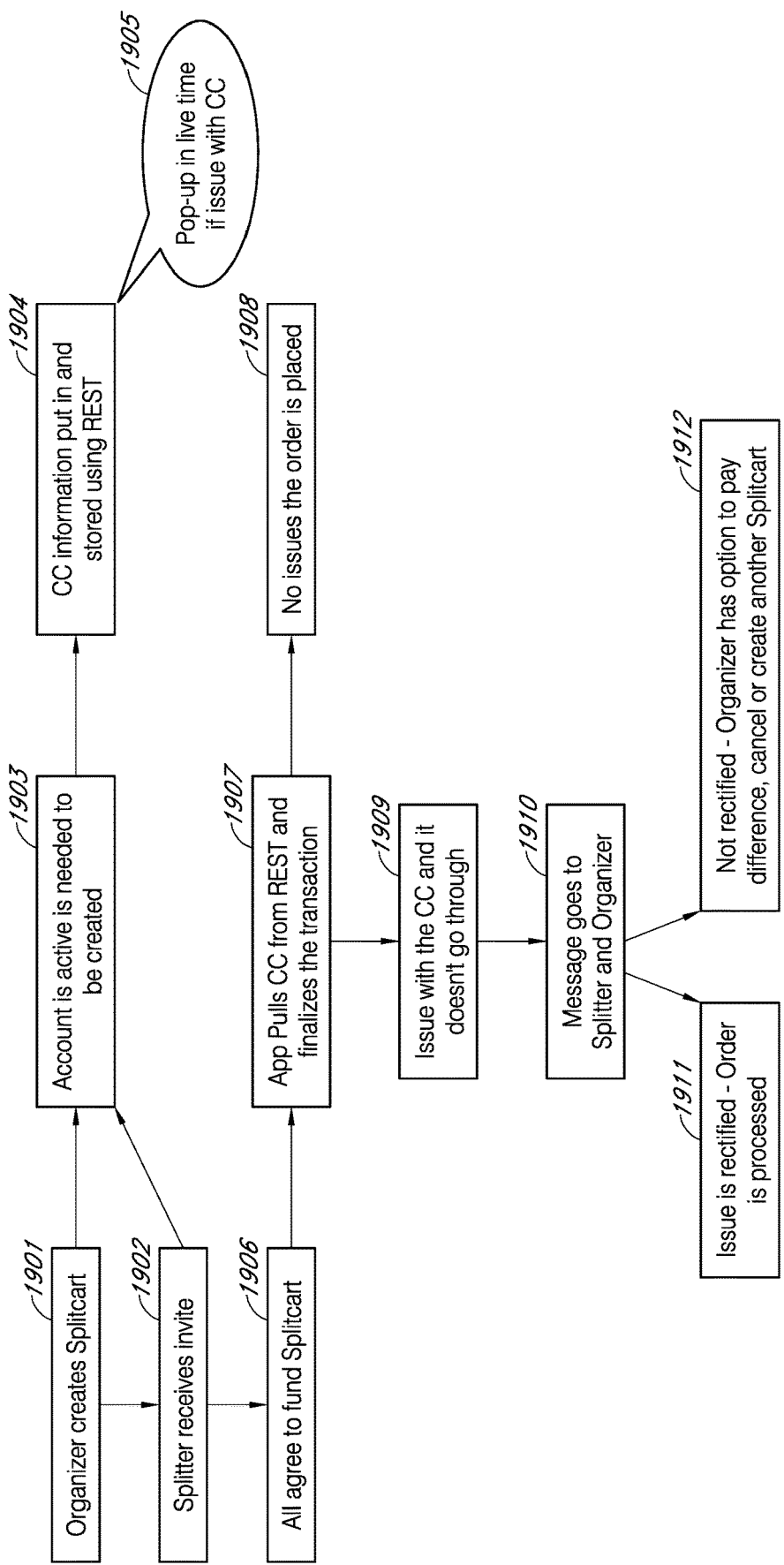
FIG. 19 is a representation of the process flow for credit cards upon account creation and acceptance and finalization of a created Splitcart disclosed herein.

FIG. 19 is representation of creating a Splitcart as it relates to the credit card (reference FIGS. 3 & 4 throughout this description). The organizer creates a Splitcart 1901 and the splitter receives and accepts the invite 1902. Both actions require an account to be created 1903 and then a credit card to be entered which is then stored using REST 1904. If the consumer enters the wrong data or there is an issue with their card a pop-up will notify them in live time 1905. Once all parties have agreed to a Splitcart 1906 there is a pull from REST 1907 to finalize all the credit card commitments. If there are no issues the order is finalized 1908. If there is an issue finalizing the consumers credit card 1909 a message 1910 (different to each) will go to the organizer and the splitter who has the issue with the card (only if an email was provided or they have the Splitcart app installed. If the issue is rectified before the deadline the order is processed 1911. If the issue is not rectified the organizer has the option to pay the difference, cancel the Splitcart or create another one 1912.

Although the methods described and disclosed herein may be configured to utilize a curative comprised of a natural materials, the scope of the present disclosure, any discrete process step and/or parameters therefor, and/or any apparatus for use therewith is not so limited and extends to any beneficial and/or advantageous use thereof without limitation unless so indicated in the following claims.

Having described preferred aspects of the various processes, apparatuses, and products made thereby, other features of the present disclosure will undoubtedly occur to those versed in the art, as will numerous modifications and alterations in the embodiments and/or aspects as illustrated herein, all of which may be achieved without departing from the spirit and scope of the present disclosure. Accordingly, the methods and embodiments pictured and described herein are for illustrative purposes only, and the scope of the present disclosure extends to all processes, apparatuses, and/or structures for providing the various benefits and/or features of the present disclosure unless so indicated in the following claims.

While the process, process steps, components thereof, apparatuses therefor and results produced according to the present disclosure have been described in connection with preferred aspects and specific examples, it is not intended that the scope be limited to the particular embodiments and/or aspects set forth, as the embodiments and/or aspects herein are intended in all respects to be illustrative rather than restrictive. Accordingly, the processes and embodiments pictured and described herein are no way limiting to the scope of the present disclosure unless so stated in the following claims.

Although several figures are drawn to accurate scale, any dimensions provided herein are for illustrative purposes only and in no way limit the scope of the present disclosure unless so indicated in the following claims. It should be noted that the processes, software and methods disclosed are not limited to the specific embodiments pictured and described herein, but rather the scope of the inventive features according to the present disclosure is defined by the claims herein. Modifications and alterations from the described embodiments will occur to those skilled in the art without departure from the spirit and scope of the present disclosure.

Any of the various features, components, functionalities, advantages, aspects, configurations, process steps etc. of a computerized transaction, a process step, and/or an application, may be used alone or in combination with one another depending on the compatibility of the features, components, functionalities, advantages, aspects, configurations, process steps, process parameters, etc. Accordingly, an infinite number of variations of the present disclosure exist. Modifications and/or substitutions of one feature, component, functionality, aspect, configuration, process step, process parameter, etc. for another in no way limit the scope of the present disclosure unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

Unless otherwise expressly stated in the claims, it is in no way intended that any process or method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

What is claimed is:

1. A method of sharing a specific cost of a selected item amongst a plurality of individuals using a software program accessible through a retailer's website, the method comprising:
   a) displaying, within a graphical user interface, a carousel of items for sale from said retailer's website;
   b) receiving, from an organizer via said graphical user interface, a selection of a first item having a specific cost from said plurality of items;
   c) displaying, within said graphical user interface, a cost splitting calculator screen for said selected first item, said cost splitting calculator screen comprising an inner ring and an outer ring;
   d) receiving, via said graphical user interface, an input actuating said inner ring by said organizer, said input indicating a selection of one or more potential contributors;
   e) in response to said input actuating said inner ring by said organizer, moving said outer ring of said cost splitting calculator screen, wherein said outer ring depicts a contribution of said organizer as a function of said one or more inputs;
   f) displaying, to said organizer, an invite contributors screen, wherein said organizer selects a plurality of individual contributors via said invite contributors screen;
   g) apportioning a first percentage or a first dollar amount of said specific cost among said plurality of invited contributors;
   h) receiving, from said organizer via said cost splitting calculator screen, a second percentage or a second dollar amount of said specific cost, wherein said second percentage or said second dollar amount corresponds to an amount said organizer will monetarily contribute to said specific cost;
   i) receiving from said organizer a date by which each invited contributor of said plurality of invited contributors must respond to said invitation by either contributing to said specific cost and becoming a monetary contributor or declining said invitation;
   j) receiving, from one or more monetary contributors of said plurality of invited contributors, one or more monetary contributions;
   k) updating, in response to the one or more monetary contributions, a visual indication displayed on the cost splitting calculator screen based on said one or more monetary contributions;
   l) in response to determining that said first percentage or said first dollar amount is not achieved by said date, prompting said organizer to select from one of two presented options, said two options comprising:
      (i) instructing said cost splitting calculator to calculate a third percentage or a third dollar amount of said specific cost based on said total, wherein said third percentage is assigned to said organizer, and wherein said third percentage or said third dollar amount replaces said second percentage or said second dollar amount; or
      (ii) terminating a transaction for said first item and converting said total associated with said monetary contributors and said second percentage of said specific cost to a gift card; and,
   (m) completing a transaction for either said first item or said gift card.

2. The method according to claim 1 wherein said software program further comprises using a mathematical formula to create a rewards system for the organizer.

3. The method according to claim 2 wherein said software program is configured to use the mathematical formula to create a rewards system for the organizer to be rewarded based on the number of contributors invited allowing the rewards system for live cash deduction from the organizers contribution amount or saved for a second split cost transaction or the purchase of at least one personal item through said software program.

4. The method according to claim 1 wherein said step of receiving said plurality of individuals from said organizer to invite further comprises providing an address book associated with said organizer.

5. The method according to claim 1 wherein said software program further comprises the steps of:
   a) using internal chat capabilities to send messages among said individual contributors and said organizer;
   b) requiring the organizer to decide a location where the item will be shipped to; and
   c) generating an estimated delivery date.

6. The method according to claim 1 wherein said software program further comprises sending an electronic notification to each said monetary contributor if said organizer choses to terminate said transaction for said first item.

7. The method according to claim 6 wherein the electronic notification functions independently of social media channels and networks for the driving social awareness for a split cost opportunity of a specific item and or sending direct messages to people on social media outlets with direct links to contribute to specifically selected items.

8. The method according to claim 1 wherein the proprietary cost splitting calculator is configured to allow an organizer to set a static amount to contribute or an equal share amount, subject to the final cost of the acquisition.

9. The method according to claim 8, wherein the proprietary cost splitting calculator is configured to split the cost of the item, taxes, shipping and other fees involved between the contributors.

10. The method according to claim 1 wherein said software program is configured to allow input of the organizer's address book.

11. The method according to claim 10 wherein said software program is further configured to allow said organizer to configure the address book to include at least a name or address of a contributor and the organizer may select a receiver of the selected item as well as add different contributors without limit.

12. The method according to claim 11 wherein said software program is configured to recalculate the calculated contribution amount in real time as the organizer adds contributors and said software program is configured to create a list to track the names, telephone numbers and emails of contributors and the total number of contributors.

13. The method according to claim 1 wherein said software program is configured with an internal chat function or system for messaging between contributors.

14. The method according to claim 13 wherein the internal chat function or system for messaging between contributors of said software program allows either personalized messaging or predetermined messaging.

15. The method according to claim 1 wherein said monetary contribution and said second monetary contribution are not equal.

16. The method according to claim 1 wherein said monetary contribution and said second monetary contribution are equal.

17. The method according to claim 1 wherein said first percentage or said first dollar amount is further defined as being distributed proportionally among said plurality of invited contributors.

18. The method according to claim 1 wherein said first percentage or said first dollar amount is further defined as being distributed unequally among said plurality of invited contributors.

\* \* \* \* \*